United States Patent
Bailey

(10) Patent No.: US 11,076,191 B2
(45) Date of Patent: Jul. 27, 2021

(54) SYSTEMS AND METHODS FOR EXTENDING AN IN-HOME SPLITTER NETWORK

(71) Applicant: PPC BROADBAND, INC., East Syracuse, NY (US)

(72) Inventor: Paul Bailey, Camillus, NY (US)

(73) Assignee: PPC BROADBAND, INC., East Syracuse, NY (US)

(*) Notice: Subject to any disclaimer, the term of this patent is extended or adjusted under 35 U.S.C. 154(b) by 118 days.

(21) Appl. No.: 16/248,313

(22) Filed: Jan. 15, 2019

(65) Prior Publication Data

US 2019/0230399 A1    Jul. 25, 2019

Related U.S. Application Data

(60) Provisional application No. 62/619,259, filed on Jan. 19, 2018, provisional application No. 62/697,771, filed on Jul. 13, 2018.

(51) Int. Cl.
| | | |
|---|---|---|
| *H04N 21/41* | (2011.01) | |
| *H04N 21/61* | (2011.01) | |
| *H04N 7/10* | (2006.01) | |

(52) U.S. Cl.
CPC ......... *H04N 21/4104* (2013.01); *H04N 7/104* (2013.01); *H04N 21/6168* (2013.01)

(58) Field of Classification Search
CPC . H04N 21/4104; H04N 7/104; H04N 21/6168
See application file for complete search history.

(56) References Cited

U.S. PATENT DOCUMENTS

| | | |
|---|---|---|
| 2,662,217 A | 12/1953 | Roberts |
| 3,790,909 A | 2/1974 | LeFevre |
| 3,939,431 A | 2/1976 | Cohlman |
| 4,027,219 A | 5/1977 | Van Alphen et al. |

(Continued)

FOREIGN PATENT DOCUMENTS

| | | |
|---|---|---|
| CN | 200941620 Y | 8/2007 |
| CN | 201048432 Y | 4/2008 |

(Continued)

OTHER PUBLICATIONS

Gallo, A., "Basics of RF Electronics", CERN Yellow Report CERN-2011-007, pp. 223-275, Dec. 14, 2011, Published Online [retrieved Mar. 11, 2019], <URL: https://arxiv.org/abs/1112.3226>.

(Continued)

*Primary Examiner* — Chenea Davis
(74) *Attorney, Agent, or Firm* — MH2 Technology Law Group LLP

(57) ABSTRACT

A system for extending an in-home splitter network includes a cable television (CATV) device that is configured to transmit and receive signals in a multimedia over coax alliance (MoCA) bandwidth and signals in a CATV bandwidth. The system also includes a MoCA device that is configured to be disposed within a user's premises. The MoCA device is configured to transmit and receive the signals in the MoCA bandwidth. The system also includes a (Continued)

reflection-less in-home network adapter (RNA) configured to be connected to and positioned between the CATV device and the MoCA device.

50 Claims, 9 Drawing Sheets

(56) References Cited

U.S. PATENT DOCUMENTS

| | | |
|---|---|---|
| 4,306,403 A | 12/1981 | Hubbard et al. |
| 4,344,499 A | 8/1982 | Van der Lely et al. |
| 4,512,033 A | 4/1985 | Schrock |
| 4,520,508 A | 5/1985 | Reichert, Jr. |
| 4,648,123 A | 3/1987 | Schrock |
| 4,677,390 A | 6/1987 | Wagner |
| 4,715,012 A | 12/1987 | Mueller, Jr. |
| 4,961,218 A | 10/1990 | Kiko |
| 4,982,440 A | 1/1991 | Dufresne et al. |
| 5,010,399 A | 4/1991 | Goodman et al. |
| 5,126,686 A | 6/1992 | Tam |
| 5,126,840 A | 6/1992 | Dufresne et al. |
| 5,214,505 A | 5/1993 | Rabowsky et al. |
| 5,231,660 A | 7/1993 | West, Jr. |
| 5,245,300 A | 9/1993 | Sasaki et al. |
| 5,369,642 A | 11/1994 | Shioka et al. |
| 5,485,630 A | 1/1996 | Lee et al. |
| 5,548,255 A | 8/1996 | Spielman |
| 5,557,319 A | 9/1996 | Gurusami et al. |
| 5,557,510 A | 9/1996 | McIntyre et al. |
| 5,604,528 A | 2/1997 | Edwards et al. |
| 5,719,792 A | 2/1998 | Bush |
| 5,740,044 A | 4/1998 | Ehrenhardt et al. |
| 5,745,836 A | 4/1998 | Williams |
| 5,745,838 A | 4/1998 | Tresness et al. |
| 5,815,794 A | 9/1998 | Williams |
| 5,839,052 A | 11/1998 | Dean et al. |
| 5,893,024 A | 4/1999 | Sanders et al. |
| 5,937,330 A | 8/1999 | Vince et al. |
| 5,950,111 A | 9/1999 | Georger et al. |
| 5,970,053 A | 10/1999 | Schick et al. |
| 6,012,271 A | 1/2000 | Wilkens et al. |
| 6,014,547 A | 1/2000 | Caporizzo et al. |
| 6,049,693 A | 4/2000 | Baran et al. |
| 6,069,960 A | 5/2000 | Mizukami et al. |
| 6,094,211 A | 7/2000 | Baran et al. |
| 6,101,932 A | 8/2000 | Wilkens |
| 6,128,040 A | 10/2000 | Shinbori et al. |
| 6,129,187 A | 10/2000 | Bellanger et al. |
| 6,173,225 B1 | 1/2001 | Stelzle et al. |
| 6,185,432 B1 | 2/2001 | Vembu |
| 6,205,138 B1 | 3/2001 | Nihal et al. |
| 6,229,375 B1 | 5/2001 | Koen |
| 6,348,837 B1 | 2/2002 | Ibelings |
| 6,348,955 B1 | 2/2002 | Tait |
| 6,373,349 B2 | 4/2002 | Gilbert |
| 6,377,316 B1 | 4/2002 | Mycynek et al. |
| 6,388,539 B1 | 5/2002 | Rice |
| 6,425,132 B1 | 7/2002 | Chappell |
| 6,430,904 B1 | 8/2002 | Coers et al. |
| 6,495,998 B1 | 12/2002 | Terreault |
| 6,498,925 B1 | 12/2002 | Tauchi |
| 6,510,152 B1 | 1/2003 | Gerszberg et al. |
| 6,545,564 B1 | 4/2003 | Coppola |
| 6,546,705 B2 | 4/2003 | Scarlett et al. |
| 6,550,063 B1 | 4/2003 | Matsuuara |
| 6,560,778 B1 | 5/2003 | Hasegawa |
| 6,570,928 B1 | 5/2003 | Shibata |
| 6,587,012 B1 | 7/2003 | Farmer et al. |
| 6,622,304 B1 | 9/2003 | Carhart |
| 6,640,338 B1 | 10/2003 | Shibata |
| 6,678,893 B1 | 1/2004 | Jung |
| 6,683,513 B2 | 1/2004 | Shamsaifar et al. |
| 6,725,462 B1 | 4/2004 | Kaplan |
| 6,728,968 B1 | 4/2004 | Abe et al. |
| 6,737,935 B1 | 5/2004 | Shafer |
| 6,757,910 B1 | 6/2004 | Bianu |
| 6,758,292 B2 | 7/2004 | Shoemaker |
| 6,804,828 B1 | 10/2004 | Shibata |
| 6,843,044 B2 | 1/2005 | Clauss |
| 6,845,232 B2 | 1/2005 | Darabi |
| 6,920,614 B1 | 1/2005 | Schindler et al. |
| 6,868,552 B1 | 3/2005 | Masuda et al. |
| 6,877,166 B1 | 4/2005 | Roeck et al. |
| 6,915,530 B1 | 7/2005 | Kauffman et al. |
| 6,928,175 B1 | 8/2005 | Bader et al. |
| 6,942,595 B2 | 9/2005 | Hrazdera |
| 7,003,275 B1 | 2/2006 | Petrovic |
| 7,029,293 B2 | 4/2006 | Shapson et al. |
| 7,039,432 B2 | 5/2006 | Stater et al. |
| 7,048,106 B2 | 5/2006 | Hou |
| 7,127,734 B1 | 10/2006 | Amit |
| 7,162,731 B2 | 1/2007 | Reidhead et al. |
| 7,254,827 B1 | 8/2007 | Terreault |
| 7,283,479 B2 | 10/2007 | Ljungdahl et al. |
| 7,399,255 B2 | 7/2008 | Johnson et al. |
| 7,404,355 B2 | 7/2008 | Viaud et al. |
| 7,416,068 B2 | 8/2008 | Ray et al. |
| 7,454,252 B2 | 11/2008 | El-Sayed |
| 7,464,526 B2 | 12/2008 | Coenen |
| 7,505,819 B2 | 3/2009 | El-Sayed |
| 7,508,284 B2 | 3/2009 | Shafer |
| 7,530,091 B2 | 5/2009 | Vaughan |
| 7,592,883 B2 | 9/2009 | Shafer |
| 7,675,381 B2 | 6/2010 | Lin |
| 7,742,777 B2 | 6/2010 | Strater et al. |
| 7,783,195 B2 | 8/2010 | Riggsby |
| 8,179,814 B2 | 5/2012 | Shafer et al. |
| 8,181,208 B1 | 5/2012 | Elwardani |
| 8,286,209 B2 | 10/2012 | Egan, Jr. |
| 8,356,322 B2 | 1/2013 | Wells et al. |
| 8,429,695 B2 | 4/2013 | Halik |
| 8,510,782 B2 | 8/2013 | Wells |
| 8,752,114 B1 | 6/2014 | Shapson et al. |
| 9,167,286 B2 | 10/2015 | Wells |
| 9,351,051 B2 | 5/2016 | Wells |
| 9,516,376 B2 | 12/2016 | Wells |
| 9,781,472 B2 | 10/2017 | Wells |
| 9,860,591 B2 | 1/2018 | Wells |
| 2001/0016950 A1 | 8/2001 | Matsuura |
| 2002/0069417 A1 | 6/2002 | Kliger |
| 2002/0141347 A1 | 10/2002 | Harp et al. |
| 2002/0144292 A1 | 10/2002 | Uemura et al. |
| 2002/0166124 A1 | 11/2002 | Gurantz et al. |
| 2002/0174423 A1 | 11/2002 | Fifield et al. |
| 2003/0005450 A1 | 1/2003 | Smith |
| 2003/0084458 A1 | 5/2003 | Ljungdahl et al. |
| 2004/0147273 A1 | 7/2004 | Morphy |
| 2004/0172659 A1 | 9/2004 | Ljungdahl et al. |
| 2004/0229561 A1 | 11/2004 | Cowley et al. |
| 2005/0034168 A1 | 2/2005 | Beveridge |
| 2005/0047051 A1 | 3/2005 | Marland |
| 2005/0144649 A1 | 6/2005 | Bertonis |
| 2005/0183130 A1 | 8/2005 | Sadja et al. |
| 2005/0210977 A1 | 9/2005 | Yan |
| 2005/0283815 A1 | 12/2005 | Brooks et al. |
| 2005/0289632 A1 | 12/2005 | Brooks et al. |
| 2006/0015921 A1 | 1/2006 | Vaughan |
| 2006/0041918 A9 | 2/2006 | Currivan et al. |
| 2006/0117371 A1 | 6/2006 | Margulis |
| 2006/0191359 A1 | 8/2006 | Tarasinski et al. |
| 2006/0205442 A1 | 9/2006 | Phillips et al. |
| 2006/0241838 A1 | 10/2006 | Mongiardo et al. |
| 2006/0282871 A1 | 12/2006 | Yo |
| 2007/0024393 A1 | 2/2007 | Forse et al. |
| 2007/0288981 A1 | 12/2007 | Mitsuse et al. |
| 2007/0288982 A1 | 12/2007 | Donahue |
| 2008/0001645 A1 | 1/2008 | Kuroki |
| 2008/0013612 A1 | 1/2008 | Miller et al. |
| 2008/0022344 A1 | 1/2008 | Riggsby |
| 2008/0040764 A1 | 2/2008 | Weinstein et al. |
| 2008/0120667 A1 | 5/2008 | Zaltsman |
| 2008/0127287 A1 | 5/2008 | Alkan et al. |
| 2008/0157898 A1 | 7/2008 | Palinkas et al. |
| 2008/0168518 A1 | 7/2008 | Hsue et al. |

(56) References Cited

U.S. PATENT DOCUMENTS

| | | | |
|---|---|---|---|
| 2008/0225902 A1 | 9/2008 | Chung | |
| 2008/0247401 A1 | 10/2008 | Bhal et al. | |
| 2008/0247541 A1 | 10/2008 | Cholas et al. | |
| 2008/0271094 A1 | 10/2008 | Kliger et al. | |
| 2008/0313691 A1 | 12/2008 | Cholas et al. | |
| 2009/0031391 A1 | 1/2009 | Urbanek | |
| 2009/0047919 A1 | 2/2009 | Phillips et al. | |
| 2009/0077608 A1 | 3/2009 | Romerein et al. | |
| 2009/0153263 A1 | 6/2009 | Lin | |
| 2009/0165070 A1 | 6/2009 | McMullin et al. | |
| 2009/0180782 A1 | 7/2009 | Bernard et al. | |
| 2009/0217325 A1 | 8/2009 | Kliger et al. | |
| 2009/0320086 A1 | 12/2009 | Rijssemus et al. | |
| 2010/0017842 A1 | 1/2010 | Wells | |
| 2010/0095344 A1 | 4/2010 | Newby | |
| 2010/0100918 A1 | 4/2010 | Egan | |
| 2010/0125877 A1 | 5/2010 | Wells | |
| 2010/0146564 A1 | 6/2010 | Halik | |
| 2010/0162340 A1* | 6/2010 | Riggsby | H04N 7/102 725/127 |
| 2010/0194489 A1 | 8/2010 | Keams et al. | |
| 2010/0225813 A1 | 9/2010 | Hirono et al. | |
| 2011/0002245 A1 | 1/2011 | Wells et al. | |
| 2011/0010749 A1 | 1/2011 | Alkan | |
| 2011/0051014 A1 | 3/2011 | Wang et al. | |
| 2011/0069740 A1 | 3/2011 | Cowley et al. | |
| 2011/0072472 A1 | 3/2011 | Wells | |
| 2011/0181371 A1* | 7/2011 | Alkan | H04L 12/2838 333/132 |
| 2011/0258677 A1 | 10/2011 | Shafer | |
| 2012/0054805 A1 | 3/2012 | Shafer | |
| 2012/0054819 A1 | 3/2012 | Alkan | |
| 2012/0081190 A1 | 4/2012 | Rijssemus | |
| 2012/0159556 A1 | 6/2012 | Alkan | |
| 2012/0331501 A1 | 12/2012 | Shafer | |
| 2013/0002958 A1 | 1/2013 | Labro | |
| 2013/0081096 A1 | 3/2013 | Wells et al. | |
| 2013/0181789 A1 | 7/2013 | Rijssemus | |
| 2013/0227632 A1 | 8/2013 | Wells et al. | |
| 2013/0283334 A1 | 10/2013 | Tsao | |
| 2015/0303891 A1* | 10/2015 | Muterspaugh | H03H 7/06 333/132 |
| 2015/0304732 A1 | 10/2015 | Shapson et al. | |
| 2018/0007318 A1 | 1/2018 | Bailey et al. | |
| 2018/0097540 A1 | 4/2018 | Uejima | |
| 2018/0205910 A1* | 7/2018 | Li | H04N 7/104 |
| 2018/0288491 A1 | 10/2018 | Shapson et al. | |
| 2019/0074904 A1* | 3/2019 | Lin | H04N 7/104 |
| 2020/0021462 A1 | 1/2020 | Bailey | |

FOREIGN PATENT DOCUMENTS

| | | | |
|---|---|---|---|
| JP | 55-080989 A | 6/1980 | |
| JP | 55-132126 A | 10/1980 | |
| JP | 58-99913 | 12/1981 | |
| JP | 57-091055 A | 6/1982 | |
| JP | 58-101582 A | 6/1983 | |
| JP | 59026709 | 8/1984 | |
| JP | 61-157035 A | 7/1986 | |
| JP | 05-191416 A | 7/1993 | |
| JP | 07-038580 A | 2/1995 | |
| JP | 11-069334 A | 3/1999 | |
| JP | 2001-177580 A | 6/2001 | |
| JP | 2004-080483 | 3/2004 | |
| JP | 2005-005875 | 1/2005 | |
| JP | 2007-166109 A | 6/2007 | |
| JP | 2007-166110 A | 6/2007 | |
| WO | 0024124 A1 | 4/2000 | |
| WO | 0172005 A1 | 9/2001 | |
| WO | 0233969 A1 | 4/2002 | |
| WO | 02091676 A1 | 11/2002 | |

OTHER PUBLICATIONS

Shane Thomas (Authorized Officer), International Search Report and Written Opinion dated Apr. 23, 2019, PCT Application No. PCT/US2019/013653, pp. 1-10.

Author Unknown, Office Action dated Jul. 31, 2014, Chinese Application No. 201110037086.1, filed Jan. 21, 2011, pp. 1-6.

Sung Lark Kwon (Authorized Officer), International Search Report dated May 31, 2011, PCT Application No. PCT/US2010/049568, filed Sep. 21, 2010, pp. 1-3.

Wells, "Cable Television Entry Adapter", U.S. Appl. No. 13/245,510, filed Sep. 26, 2011.

Office Action Summary dated Mar. 6, 2012, U.S. Appl. No. 12/563,719, filed Sep. 21, 2009, pp. 1-13.

Office Action Summary dated Jan. 23, 2012, U.S. Appl. No. 12/250,229, filed Oct. 13, 2008, pp. 1-25.

Office Action Summary dated Nov. 11, 2011, U.S. Appl. No. 12/255,008, filed Oct. 21, 2008, pp. 1-22.

Pre-Interview First Office Action dated Jun. 8, 2018, U.S. Appl. No. 15/890,573, pp. 1-24.

Pre-Interview First Office Action dated Jun. 18, 2018, U.S. Appl. No. 15/891,441, pp. 1-24.

Shane Thomas (Authorized Officer), International Search Report and Written Opinion dated Nov. 2, 2017, PCT Application No. PCT/US2017/040260, pp. 1-18.

Non-Final Office Action dated Feb. 26, 2016, U.S. Appl. No. 14/881,686, pp. 1-6.

Non-Final Office Action dated May 18, 2018, U.S. Appl. No. 15/722,302, pp. 1-34.

Pre-Interview First Office Action dated Aug. 15, 2018, U.S. Appl. No. 15/886,800, filed Feb. 1, 2018, pp. 1-30.

Notice of Allowance dated Sep. 28, 2018, U.S. Appl. No. 15/880,363, filed Jan. 25, 2018, pp. 1-70.

First Action Interview Office action dated Sep. 21, 2018, U.S. Appl. No. 15/880,166, filed Jan. 25, 2018, pp. 1-14.

Notice of Allowance dated Oct. 17, 2018, U.S. Appl. No. 15/890,573, filed Feb. 7, 2018, pp. 1-20.

Pre-Interview First Office Action dated Jul. 16, 2018, U.S. Appl. No. 15/880,166, filed Jan. 25, 2018, pp. 1-10.

Pre-Interview First Office Action dated Aug. 3, 2018, U.S. Appl. No. 15/880,363, filed Jan. 25, 2018, pp. 1-30.

First Action Interview Office Action dated Aug. 10, 2018, U.S. Appl. No. 15/890,573, filed Feb. 7, 2018, pp. 1-15.

First Action Interview Office Action dated Aug. 10, 2018, U.S. Appl. No. 15/891,441, filed Feb. 8, 2018, pp. 1-15.

Pre-Interview First Office Action dated Aug. 10, 2018, U.S. Appl. No. 15/886,788, filed Feb. 1, 2018, pp. 1-30.

Notice of Allowance dated Oct. 18, 2018, U.S. Appl. No. 15/880,166, filed Jan. 25, 2018, pp. 1-38.

Notice of Allowance dated Oct. 18, 2018, U.S. Appl. No. 15/886,788, filed Feb. 1, 2018, pp. 1-30.

Final Office Action dated Jan. 30, 2019, U.S. Appl. No. 15/891,441, filed Feb. 8, 2018, pp. 1-24.

Paul Bailey, "Dual-Network Splitter", U.S. Appl. No. 16/248,397, filed Jan. 15, 2019.

Lee W. Young (Authorized Officer), International Search Report and Written Opinion dated Apr. 12, 2019, PCT Application No. PCT/US2019/013662, pp. 1-16.

Wells et al., "Entry Device for Communicating Signals Between an External Network and an In-Home Network", U.S. Appl. No. 16/564,949, filed Sep. 9, 2019.

Non-Final Office Action dated Mar. 5, 2020, U.S. Appl. No. 16/564,949, 55 pages.

Non-Final Office Action dated Jun. 26, 2020, U.S. Appl. No. 16/248,397, 25 pages.

Non-Final Office Action dated Nov. 10, 2020, U.S. Appl. No. 16/248,397.

* cited by examiner

SYSTEMS AND METHODS FOR EXTENDING AN IN-HOME SPLITTER NETWORK

CROSS-REFERENCE TO RELATED APPLICATIONS

This application claims priority to U.S. Provisional Patent Application No. 62/619,259, filed on Jan. 19, 2018, and U.S. Provisional Patent Application No. 62/697,771, filed on Jul. 13, 2018. The entirety of both applications is incorporated by reference herein.

BACKGROUND

Typical legacy splitters or power dividers that are used in cable television (CATV) and multimedia over coax alliance (MoCA) networks have predominantly used ferrite transformers to provide a broadband circuit with low input-to-output loss and high output-to-output isolation. These ferrite splitter circuits are structured in many different ways to include additional intermediate circuits to achieve acceptable in-home performance for the CATV bandwidths (e.g., 5-1002 MHz) and MoCA bandwidths (e.g., 1125-1675 MHz). In such ferrite core splitters, however, the extension of bandwidth and/or the addition of intermediate circuits both increase input-to-output losses and have high isolation in the output-to-output MoCA band with notches that may cause loss of in-band signals. Extending the network by cascading ferrite core splitters may further degrade the in-band performance. Notches may be prevalent in both the CATV and MoCA bandwidths. The notches are amplified by circuit mismatches and altering intra-device line lengths. Therefore, it would be desirable, when cascading splitter devices for single network output extension (e.g., for the in-home or MoCA only network), to have a new reflection-less adapter that will absorb or attenuate the out-of-band signals, preventing such transmitted or reflected signals from introducing noise into a coupled access or CATV network.

SUMMARY

A system for extending an in-home splitter network includes a cable television (CATV) device that is configured to transmit and receive signals in a first bandwidth and signals in a second bandwidth. The first bandwidth is higher than the second bandwidth. The system also includes an in-home network splitter that includes an input configured to be connected to the CATV device, a common node, and a plurality of outputs. The system also includes a reflection-less in-home network adapter (RNA) configured to be connected to and positioned between the input and the common node. The RNA includes a diplexer comprising a high-pass filter and a low-pass filter. The high-pass filter is configured to pass the signals in the first bandwidth to the common node and the plurality of outputs, and the low-pass filter is configured to terminate or attenuate the signals in the second bandwidth. The system also includes a multimedia over coax alliance (MoCA) customer premise equipment (CPE) device configured to be connected to one of the plurality of outputs. The MoCA CPE device is configured to be disposed within a user's premises. The MoCA CPE device is configured to transmit and receive the signals in the first bandwidth. The MoCA CPE device is not configured to transmit and receive the signals in the second bandwidth.

In another embodiment, the system includes a cable television (CATV) device that is configured to transmit and receive signals in a multimedia over coax alliance (MoCA) bandwidth and signals in a CATV bandwidth. The system also includes a MoCA device that is configured to be disposed within a user's premises. The MoCA device is configured to transmit and receive the signals in the MoCA bandwidth. The system also includes a reflection-less in-home network adapter (RNA) configured to be connected to and positioned between the CATV device and the MoCA device.

In another embodiment, the system includes a cable television (CATV) device that is configured to transmit and receive signals in a first bandwidth and signals in a second bandwidth. The first bandwidth is from about 1125 MHz to about 1675 MHz, and the second bandwidth is from about 5 MHz to about 1002 MHz. The system also includes a multimedia over coax alliance (MoCA) device that is configured to be disposed within a user's premises. The MoCA device is configured to transmit and receive the signals in the first bandwidth. The MoCA device is not configured to transmit and receive the signals in the second bandwidth. The system also includes a reflection-less in-home network adapter (RNA) that is configured to be connected to and positioned between the CATV device and the MoCA device. The RNA allows the signals in the first bandwidth to pass from the CATV device to the MoCA device and from the MoCA device to the CATV device. The RNA prevents the signals in the second bandwidth from passing from the CATV device to the MoCA device.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

Extending an in-home splitter network may involve replacing an existing splitter with a different (e.g., larger) splitter or cascading multiple splitters to expand the output quantity. However, doing this may involve the appropriate selection of devices (e.g., splitters) and a knowledge as to the acceptable upstream/downstream losses along with the impact of the devices on the output-to-output isolation. The selected devices are intended to provide improved performance, minimal loss and improved flatness in the passbands with maximum rejection in the stop bands, good linearity, minimal to no interference signals or noise, and high reliability. As described in greater detail below, this may be achieved by extending a dedicated in-home network using a hybrid CATV/MoCA splitter with a dedicated resistive in-home network splitter or cascading dedicated resistive in-home network splitters. This may overcome the drawbacks discussed above.

Extending a dedicated in-home network using a hybrid CATV/MoCA splitter with a dedicated resistive in-home network splitter, or a cascading dedicated resistive in-home network splitters, can provide an improved alternative to extending the number of outputs within an individual splitter. Doing this offers in-home network flexibility, lower inventory costs, a greater percentage of functional usage per device, more user-friendly form factors, etc. Moreover, it is the simple form factor and ease of use that makes the smaller cascaded splitters more desirable. Interconnecting them may involve some modifications to balance the signal losses and to ensure that this does not interfere with other networks.

Embodiments consistent with the present disclosure modify an add-on device (e.g., splitter). Modifying add-on devices, such as an add-on resistive in-home splitter, may involve adjustment (e.g., removal) of the resistance at the input or coupling port. In another embodiment, the add-on device may include a reflection-less network adapter (RNA) to prevent interference and noise in the non-in-home signal bandwidth (e.g., the CATV Band). Additionally, the add-on device can have a high-pass filter (HPF) at the input port or each of the output ports to provide low-frequency ingress rejection. The RNA may be positioned at the input port or coupling port to ensure that the device is also usable as a standalone in-home network device for use in any in-home network configuration. In this position, the RNA may block unwanted interference signals and noise.

Figure 1:
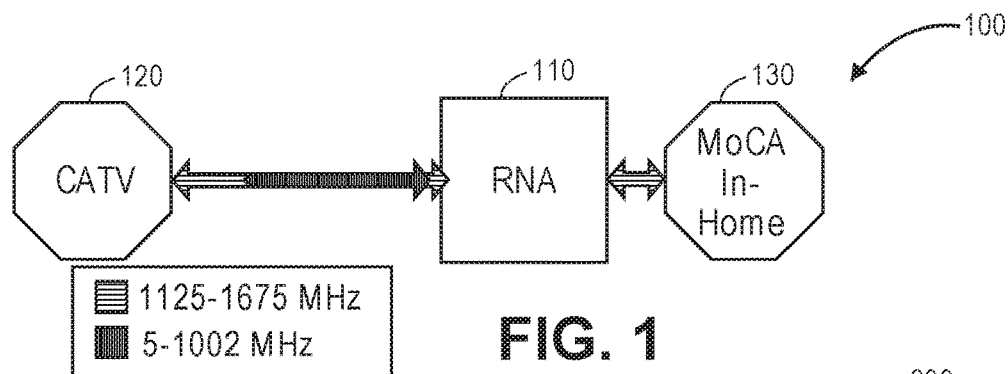
FIG. 1 illustrates a schematic view of a reflection-less in-home network adapter (RNA) passing in-home (e.g., MoCA) signals and absorbing and/or attenuating non-in-home (e.g., CATV) signals, according to an embodiment.

FIG. 1 illustrates a schematic view of a system 100 including a RNA 110, according to an embodiment. The RNA 110 may be connected to and positioned between a CATV device 120 and a MoCA in-home device 130. The CATV device 120 may be or include an active entry device that passes back and forth non-in-home signals in the CATV bandwidth (e.g., 5-1002 MHz). When the RNA 110 is added to the system 100, the in-home signals in the MoCA bandwidth (e.g., 1125-1675 MHz) may travel in both directions through the RNA 110. In other words, the signals in the MoCA bandwidth may travel from the CATV device 120, through the RNA 110, and to the MoCA in-home device 130, and from the MoCA in-home device 130, through the RNA 110, and to the CATV device 120. However, when the RNA 110 is added to the system 100, the non-in-home signals or noise in the CATV bandwidth are absorbed or terminated in/by the RNA 110 and thus do not travel in the (e.g., upstream) direction toward the CATV device 120. In addition, the CATV band signals from the CATV device 120 are not reflected back into the CATV device 120.

Figure 2:
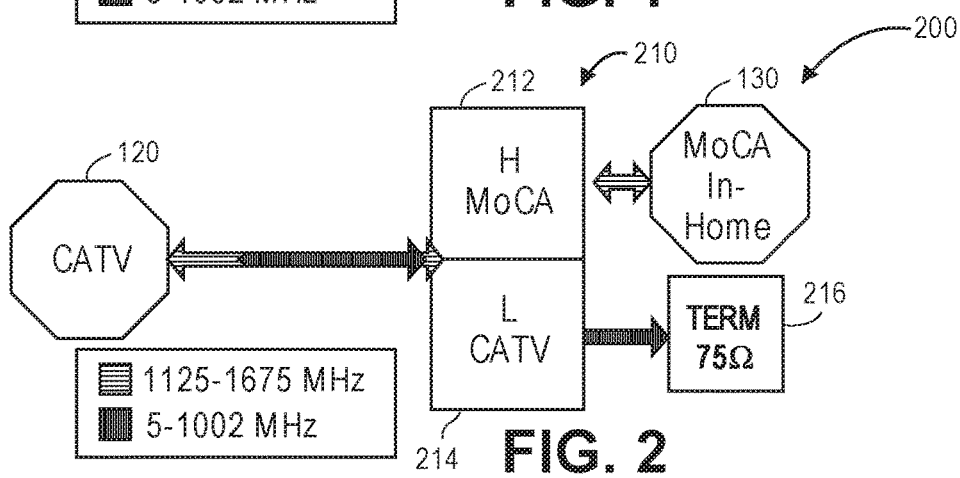
FIG. 2 illustrates a schematic view of a RNA with a terminated low-pass filter, according to an embodiment.

FIG. 2 illustrates a schematic view of a system 200 including a RNA 210 with a terminated low-pass filter 214, according to an embodiment. In this embodiment, the RNA 210 may be or include a diplexer including a high-pass filter 212 and a low-pass filter 214. The in-home signals in the MoCA bandwidth may travel in both directions through the RNA 210. More particularly, the signals in the MoCA bandwidth may travel from the CATV device 120, through the high-pass filter 212 of the RNA 210, and to the MoCA in-home device 130, and from the MoCA in-home device 130, through high-pass filter 212 of the RNA 210, and to the CATV device 120. The non-in-home signals in the CATV bandwidth may travel in a first (e.g., downstream) direction from the CATV device 120, through the low-pass filter 214. There, the low-pass filter 214 may be terminated (e.g., with a 75 ohm resistor 216). The non-in-home signals in the CATV bandwidth may not travel in a second (e.g., upstream) direction through the RNA 210.

Figure 3:
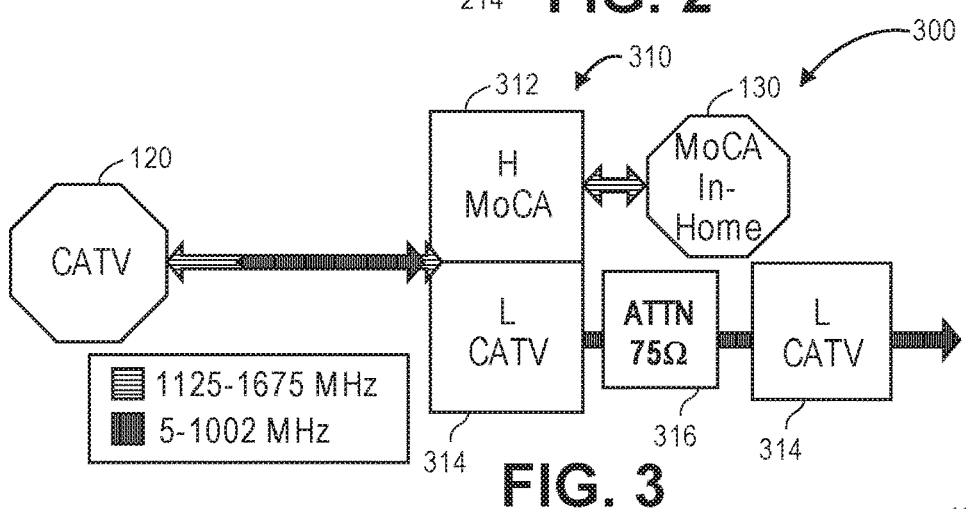
FIG. 3 illustrates a schematic view of a RNA with a low-pass filter incorporating an attenuation circuit, according to an embodiment.

FIG. 3 illustrates a schematic view of a system 300 including a RNA 310 with a low-pass filter 314 incorporating an attenuation circuit 316, according to an embodiment. As in FIG. 2, the RNA 310 in FIG. 3 may be or include a diplexer. In this embodiment, the outputs of the high-pass filter 312 and the low-pass filter 314 are isolated from one another. The low-pass filter 314 of the RNA 310 may include an attenuation circuit (e.g., including a 75 ohm resistor) 316. The attenuation circuit 316 may attenuate the non-in-home signals in the CATV bandwidth that pass through the low-pass filter 314 of the RNA 310 (and the attenuation circuit 316) to the point where there are no reflections and no return (e.g., upstream) signal.

Figure 4:
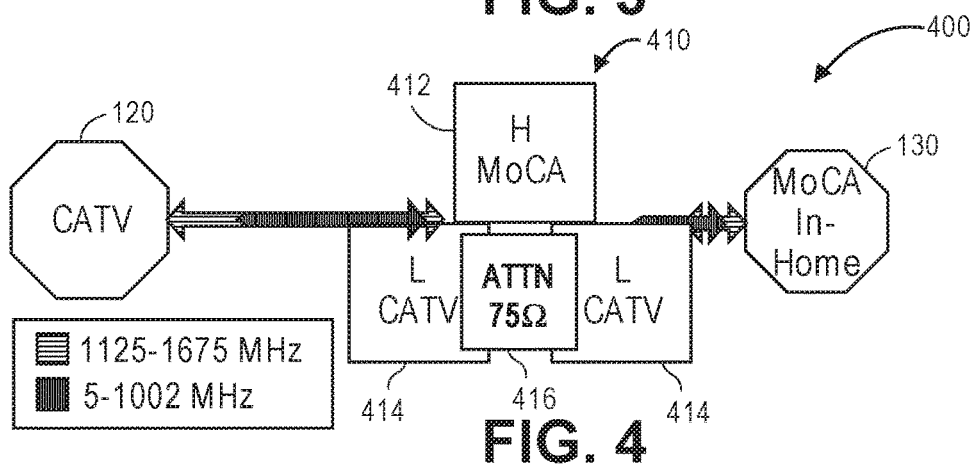
FIG. 4 illustrates another schematic view of a RNA with a low-pass filter incorporating an attenuation circuit, according to an embodiment.

FIG. 4 illustrates a schematic view of another system 400 including a RNA 410 with a low-pass filter 414 incorporating an attenuation circuit 416, according to an embodiment. As in FIG. 3, the RNA 410 in FIG. 4 may be or include a diplexer, and the low-pass filter 414 may include an attenuation circuit 416. However, unlike the RNA 310 in FIG. 3, the high-pass filter 412 and the low-pass filter 414 in the RNA 410 in FIG. 4 may have a common input and a common output. In other words, the high-pass filter 412 and the low-pass filter 414 may be connected in parallel.

Figure 5:
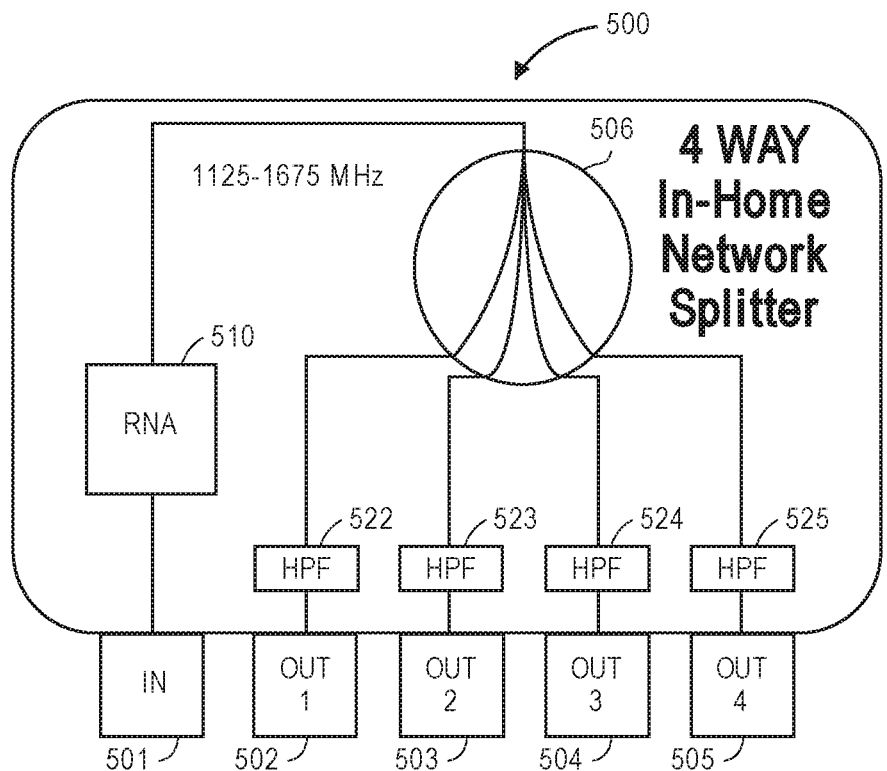
FIG. 5 illustrates a schematic view of a ferrite CATV/MoCA splitter that includes a RNA, according to an embodiment.

FIG. 5 illustrates a schematic view of a ferrite CATV/MoCA splitter 500 that includes a RNA 510, according to an embodiment. The splitter 500 may be or include an in-home-only splitter either resistive, or ferrite core, or any combination thereof. The splitter 500 may include an input 501 and a plurality of outputs (four are shown: 502-505). The RNA 510 may be connected to and positioned between the input port 501 and a common node 506 of the in-home splitter.

Additionally, the RNA 510 may be configured in the same orientation external to the input port 501. The RNA 510 may absorb and prevent interference on the access side (e.g., connected to the input 501) and also mitigate noise and low frequencies from leaving the in-home side (e.g., connected to the outputs 502-505). Thus, the RNA 510 may preserve return loss.

HPFs 522-525 may be used at the outputs 502-505 to further isolate low frequency noise, surge, and ESD. The RNA 510 may also prevent reflections at the input 501 in the CATV band when the HPFs 502-505 are used at the outputs 502-505. In addition, the RNA 510 may mitigate noise and/or suppress in-home noise in the CATV band from being transmitted through the input 501 with or without the use of the HPFs 522-525 at the outputs 502-505. The HPFs 522-525 may be any combination of series DC-blocking capacitance and shunt coils. The RNA 510 may be used to prevent reflections in the CATV band.

Figure 6:
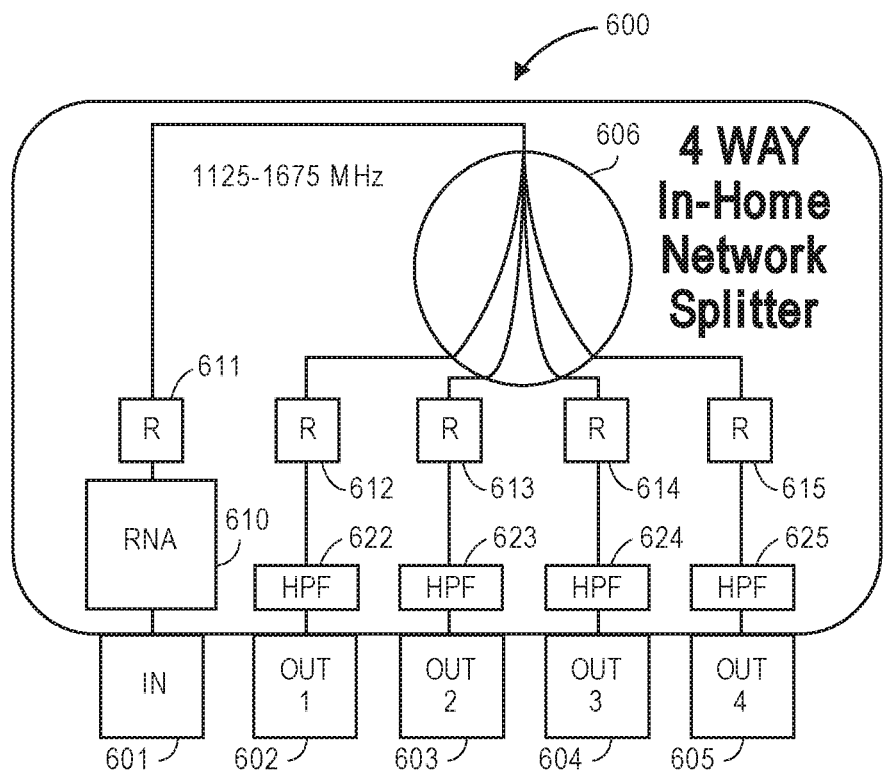
FIG. 6 illustrates a schematic view of an in-home-only resistive splitter that includes a RNA, according to an embodiment.

FIG. 6 illustrates a schematic view of an in-home-only resistive splitter 600 that includes a RNA 610, according to an embodiment. The splitter 600 may be or include an in-home-only resistive wye-type splitter. Thus, the splitter 600 may include a resistor 611 connected to and positioned between the RNA 610 and the common node 606, and a resistor 612-615 positioned between the common node 606 and each output 602-605. The resistors 611-615 may all have a substantially equal value (e.g., 45 ohms). In at least one embodiment, the value of the resistor 611 may be minimized, or the resistor 611 may be omitted/removed, to minimize insertion loss between the input 601 and any of the outputs 602-605.

HPFs 622-625 may be used at the outputs 602-605 to further isolate low frequency noise, surge, and ESD. The RNA 610 may also prevent reflections at the input 601 in the CATV band when the HPFs 602-605 are used at the outputs 602-605. In addition, the RNA 610 may mitigate noise and/or suppress in-home noise in the CATV band from being transmitted through the input 601 with or without the use of the HPFs 622-625 at the outputs 602-605. The HPFs 622-625 may be any combination of series DC-blocking capacitance and shunt coils. The RNA 610 may be used to prevent reflections in the CATV band.

Figure 7:
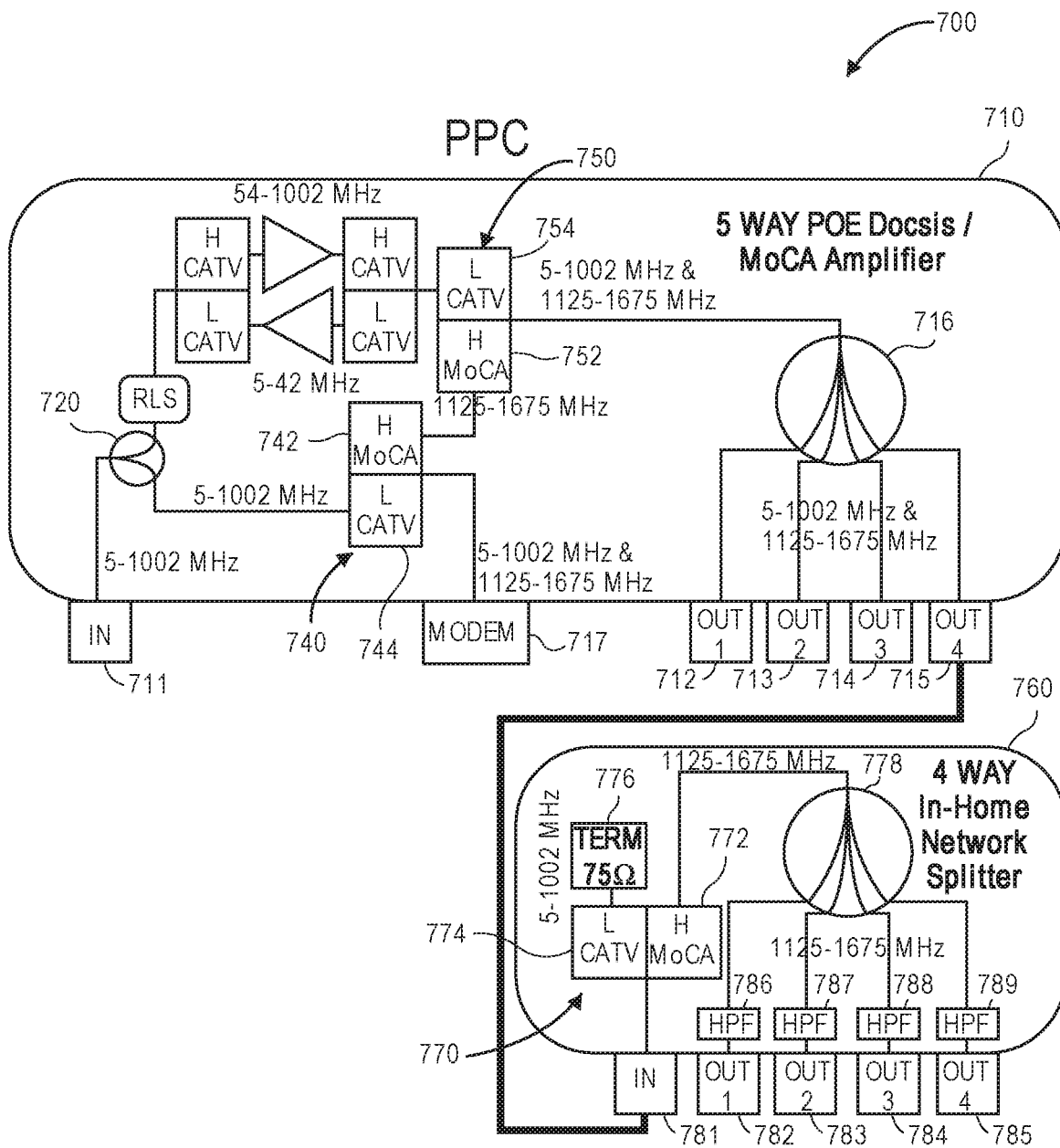
FIG. 7 illustrates a schematic view of a system including an amplifier and an in-home network splitter, according to an embodiment.

FIG. 7 illustrates a schematic view of a system 700 including an amplifier 710 and a (e.g., 4-way) in-home network splitter 760, according to an embodiment. The amplifier 710 may be or include a 5-way (POE) docsis/MoCA amplifier. The amplifier 710 may be an access/in-home device. The amplifier 710 may pass all upstream and downstream signals to the CATV headend and pass MoCA signals between every output port. Coupling the dedicated in-home splitter 760 to the amplifier 710 may generate adverse effects (e.g., cause CATV band reflections). To prevent these adverse effects, an RNA 770 is shown in the splitter 760. The amplifier MoCA diplexers are MoCA bridging/POE diplex filters, rather than in-home reflection-less network adapters. They do not absorb or attenuate the CATV band.

The signals in the CATV and MoCA bandwidths that exit the output 715 of the amplifier 710 may be introduced into the input 781 of the splitter 760, where they are then introduced into the RNA 770. The signals in the CATV bandwidth may pass through the low-pass filter 774 of the third RNA 770 and terminate in a matched terminator (e.g., including a 75 ohm resistor) 776. This may maintain a good match on the amplifier 710. The signals in the MoCA bandwidth may pass through the high-pass filter 772 of the RNA 770 before being split and introduced to the outputs 782-785 of the splitter 778. The RNA 770 may be used between CATV/MoCA amplifiers and ferrite CATV/MoCA splitter devices or between CATV/MoCA amplifiers and in-home-only resistive splitter devices.

HPFs 786-789 may be used at the outputs 782-785 to further isolate low frequency noise, surge, and ESD. The HPFs 786-789 may be any combination of series DC-blocking capacitance and shunt coils.

Figure 8:
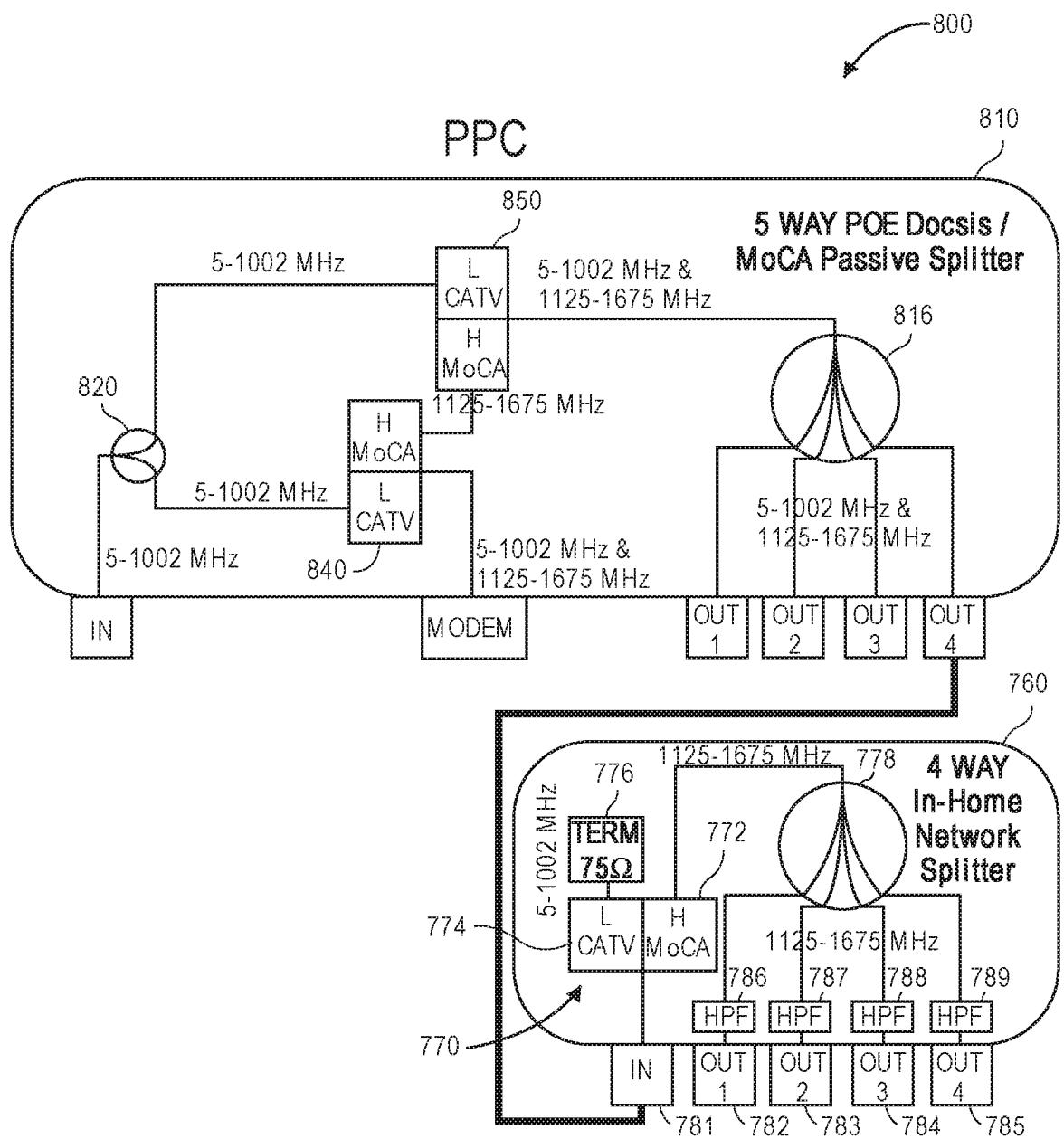
FIG. 8 illustrates a schematic view of a system including a passive splitter and an in-home network splitter, according to an embodiment.

FIG. 8 illustrates a schematic view of a system 800 including a passive splitter 810 and the (e.g., 4-way) in-home network splitter 760, according to an embodiment. The passive splitter 810 may be or include a 5-way point-of-entry (POE) docsis/MoCA passive splitter. The passive splitter 810 may pass all access to all ports, and MoCA between all outputs and may be stopped/blocked at the diplexers where it is reflected back by the low-pass filter sections. As a result, when the dedicated in-home-only network splitter 760 is connected to the passive splitter 810, the RNA 770 may preserve both networks. The RNA 770 input has an impedance match (e.g., return loss>18 dB) in the CATV band with the access splitter outputs preventing interference reflections. The RNA 770 input may have an industry standard impedance match (e.g., return loss>5 dB) in the MoCA band with the access splitter outputs minimizing interference reflections in either direction.

The (e.g., 4-way) in-home network splitter 760 may be the same as in FIG. 7. The CATV signals pass upstream (i.e., from the customer premises equipment (CPE) access device) and downstream (i.e., from the headend CMTS) between the input and output of the access splitter 810 where they are coupled to the input of the in-home-only network splitter 760 and absorbed or attenuated in the low pass section of the RNA 770 to prevent interference reflections. The MoCA signals pass between the outputs of the access splitter 810 (i.e., from/to CPE access devices such as: modems, gateways, DVRs) where they are coupled to the input of the in-home-only network splitter 760 and passed through the high pass section of the RNA 770 to and between all outputs 782-785 of the in-home-only network splitter 760 (i.e., from/to CPE such as: STBs stet top boxes, digital television adapters (DTAs)). The CPE set top boxes may be 100% MoCA only or both CATV and MoCA capable. Both will work, however, when deployed in an in-home MoCA only architecture. In this instance, only the MoCA features will function.

Figure 9:
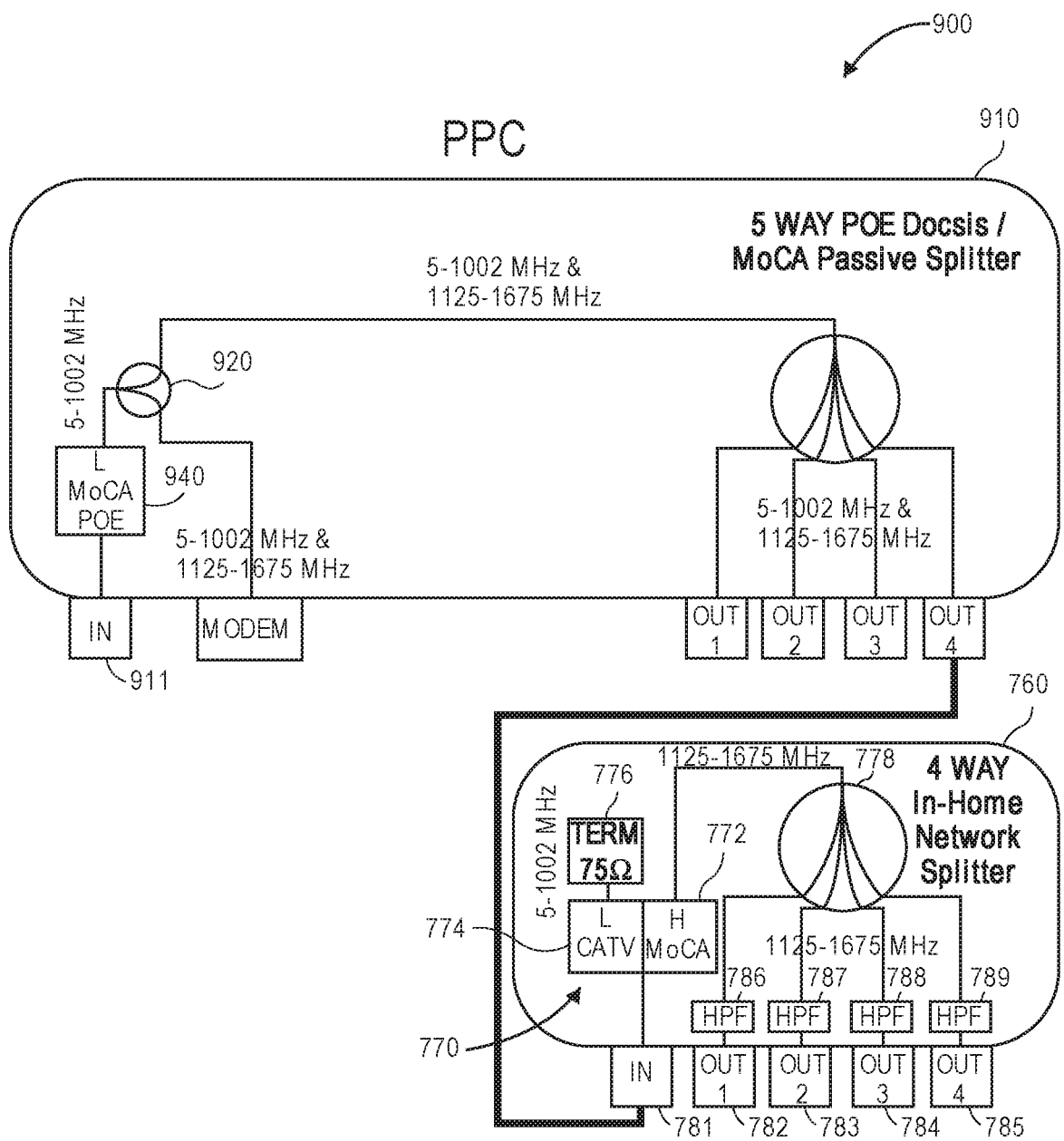
FIG. 9 illustrates a schematic view of another system including a passive splitter and an in-home network splitter, according to an embodiment.

FIG. 9 illustrates a schematic view of another system 900 including a passive splitter 910 and the (e.g., 4-way) in-home network splitter 760, according to an embodiment. The passive splitter 910 may be or include a 5-way POE docsis/MoCA passive splitter. The passive splitter 910 may include a low-pass MoCA POE filter 940 connected between the input 911 and the two-way splitter 920. This qualifies the passive splitter 910 as a passive entry splitter employed at the demarcation or drop point of the customer premises. The operation and signal flow of the passive splitter 910 is very similar to that of passive splitter 810 with the difference being the MoCA signal reflection point is located at the POE LPF 940 rather than the POE MoCA diplexers 840, 850. The (e.g., 4-way) in-home network splitter 760 may be the same as in FIGS. 7 and 8.

Figure 10:
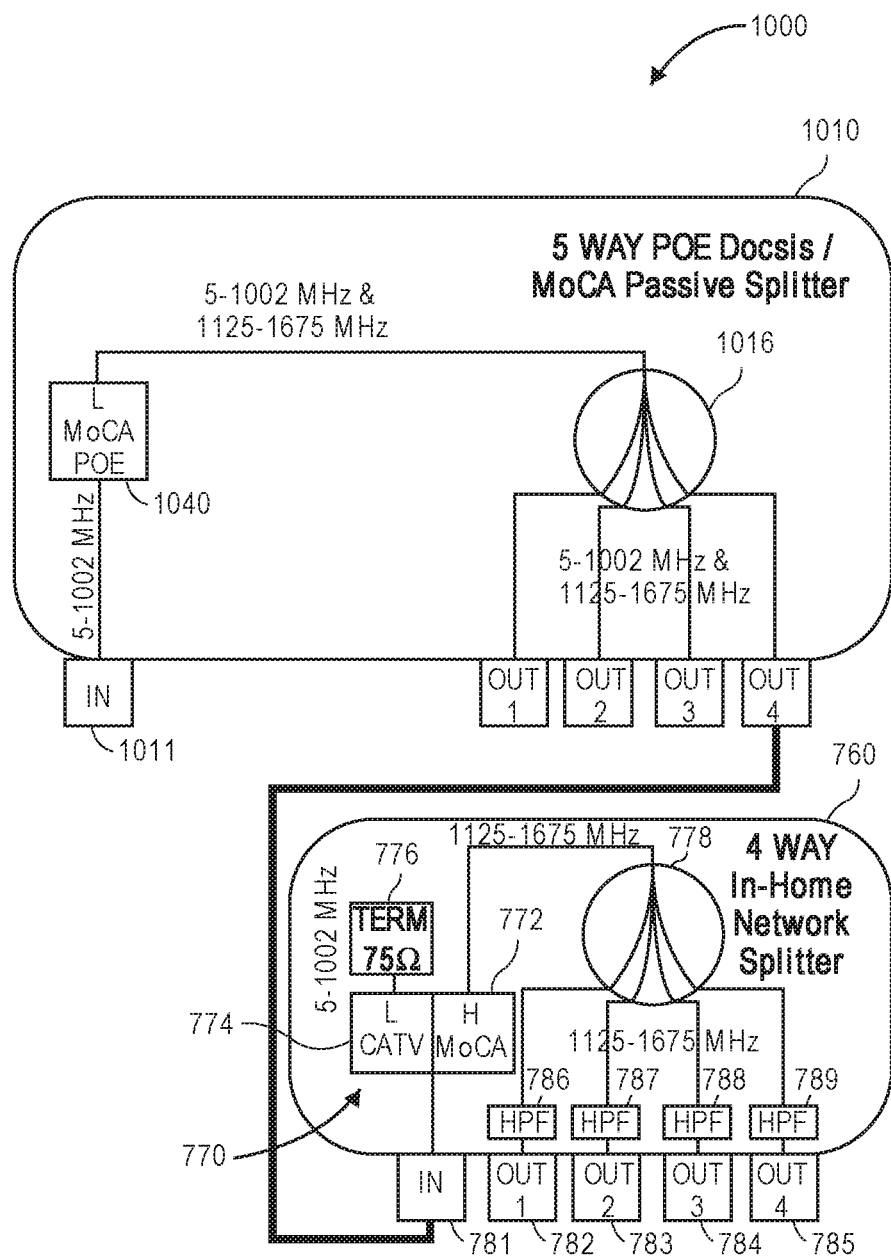
FIG. 10 illustrates a schematic view of another system including a passive splitter and an in-home network splitter, according to an embodiment.

FIG. 10 illustrates a schematic view of another system 1000 including a passive splitter 1010 and a (e.g., 4-way) in-home network splitter 760, according to an embodiment. The passive splitter 1010 may be or include a 5-way POE docsis/MoCA passive splitter. The modem and the two-way splitter of FIGS. 7-9 may be omitted in this embodiment. The low pass MoCA POE filter 1040 may be employed external to the input 1011 of the splitter 1010. When the low-pass MoCA POE filter 1040 is employed external to the input 1011 of the passive splitter 1010, this qualifies the passive splitter 1010 as a passive entry splitter employed at the demarcation or drop point of the customer premises. The operation and signal flow of the passive splitter 1010 is similar to that of passive splitter 810 with the difference being that the MoCA signal reflection point is located at the POE LPF 1040 rather than at the POE MoCA diplexers 740, 750. The (e.g., 4-way) in-home network splitter 760 may be the same as in FIGS. 7-9.

Figure 11:
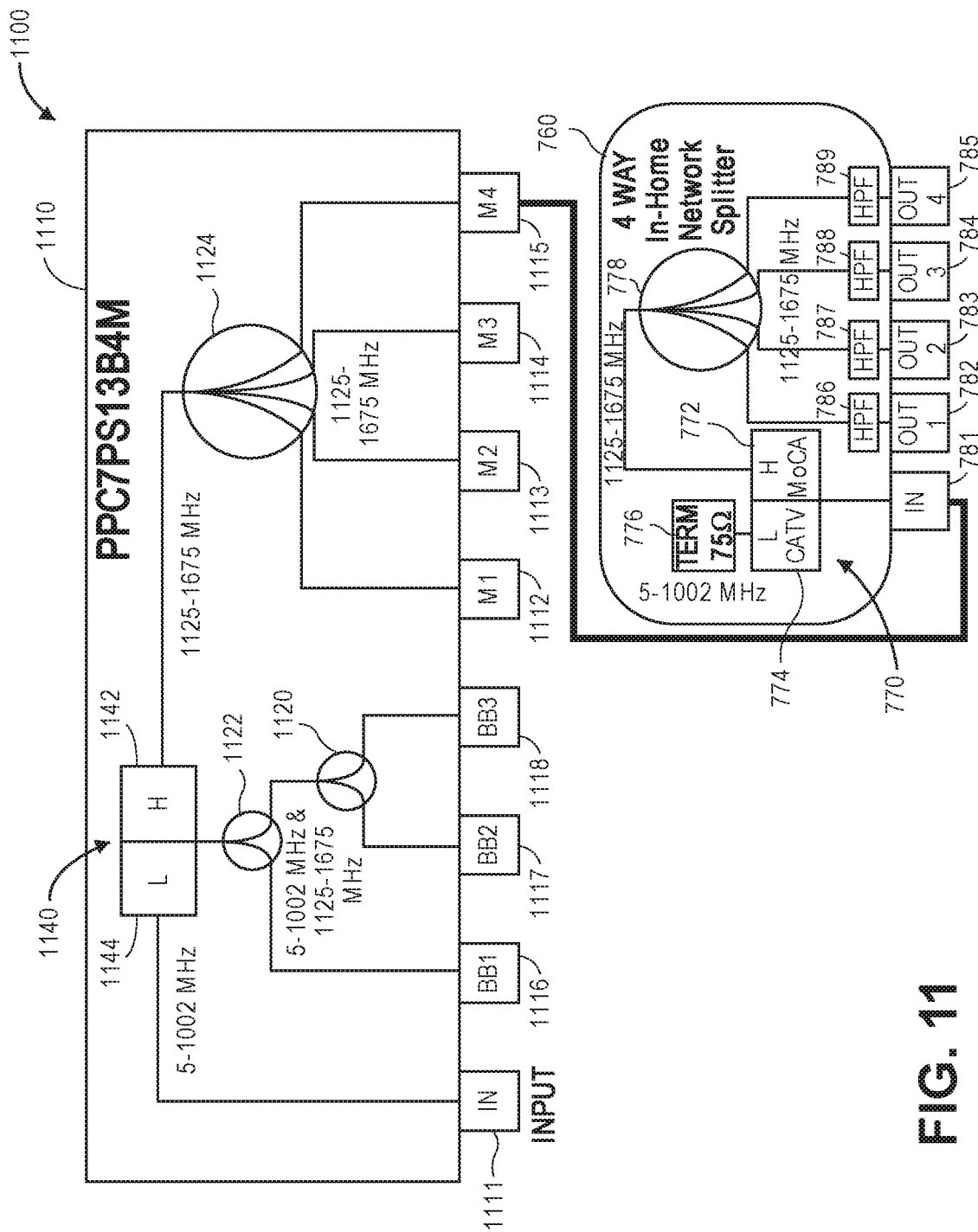
FIG. 11 illustrates a schematic view of a system including a 7-way passive splitter and an in-home network splitter, according to an embodiment.

FIG. 11 illustrates a schematic view of a system 1100 including a 7-way POE docsis/MoCA passive splitter 1110 and the (e.g., 4-way) in-home network splitter 760, according to an embodiment. The 7-way passive splitter 1110 may include an input port 1111, one or more dedicated in-home MoCA ports (four are shown: 1112-1115), and one or more CATV/MoCA access ports (three are shown: 1116-1118) capable of being used for transmitting signals in the in-home MoCA bandwidth and in the CATV bandwidth.

A two-way splitter 1120 may be connected to the ports 1117, 1118. Another two-way splitter 1122 may be connected to the port 1116 and the two-way splitter 1120. A diplexer 1140 may have a low-pass filter 1144 connected to the input 1111, a common port connected to the two-way splitter 1122, and a high-pass filter 1142 connected to a four-way splitter 1124, which is connected to the ports 1112-1115. The diplexer 1140 may allow signals in the in-home MoCA bandwidth to traverse through the high-pass filter 1142 and common port, and through the two-way splitters 1120, 1122. The two-way splitters 1120, 1122 may be ferrite or resistive. Various configurations may include either a direct coupling between the common node of the diplexer 1140 to a CATV/MoCA access port 1116 and/or a cascaded combination of ferrite and/or resistive splitters coupled between the common node of diplexer 1140 to one or more CATV/MoCA access ports 1116-1118. More particularly, access networks may use ferrite splitters, and in-home networks may use resistive splitters. When the low-pass section 1144 of the MoCA POE diplexer 1042 is employed with the low-pass section 1144 coupled to the input of the 7-way POE Docsis/MoCA passive splitter 1110, it qualifies the splitter 1110 as a passive entry splitter employed at the demarcation or drop point of the customer premises. The operation and signal flow of 7-way POE Docsis/MoCA passive splitter 1110 is similar to that of passive splitter 810 with the difference being the MoCA signal reflection point located at the POE LPF section 1144 rather than the POE MoCA diplexers 840, 850.

Figure 12:
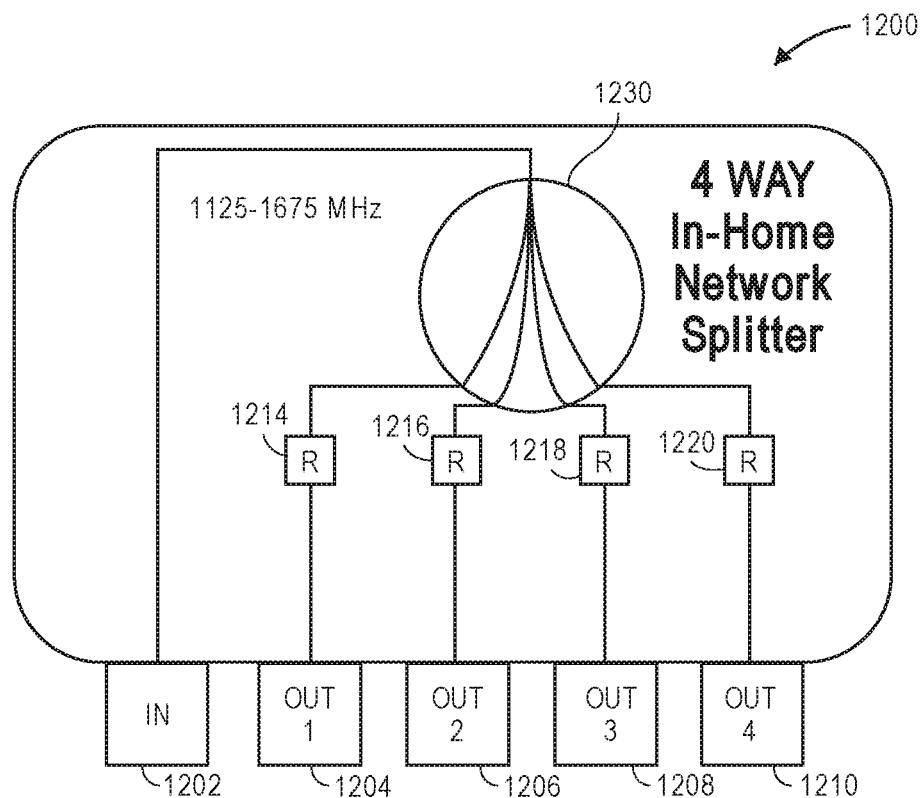
FIG. 12 illustrates a schematic view of an example of a resistive in-home network splitter, in accordance with aspects of the present disclosure.

FIG. 12 illustrates a schematic view of an example of a resistive in-home network splitter 1200, in accordance with aspects of the present disclosure. The splitter 1200 may be a 4-way splitter including an input port 1202 and one or more output ports (four are shown: 1204, 1206, 1208, 1210). There may be a resistor (1214, 1216, 1218, 1220) connected between the common node 1230 and each of the output ports 1204, 1206, 1208, 1210. However, as shown, a resistor may be omitted from between the input port 1202 and the common node 1230. In another embodiment, a resistor may be connected between the input point 1202 and the common node 1230; however, the resistance of that resistor may be less than the values of resistors 1214-1220. Reducing or eliminating the resistance at the input port 1202 may minimize the through-loss from the splitter 1200 to the device with which the splitter 1200 is coupled or cascaded.

Figure 13:
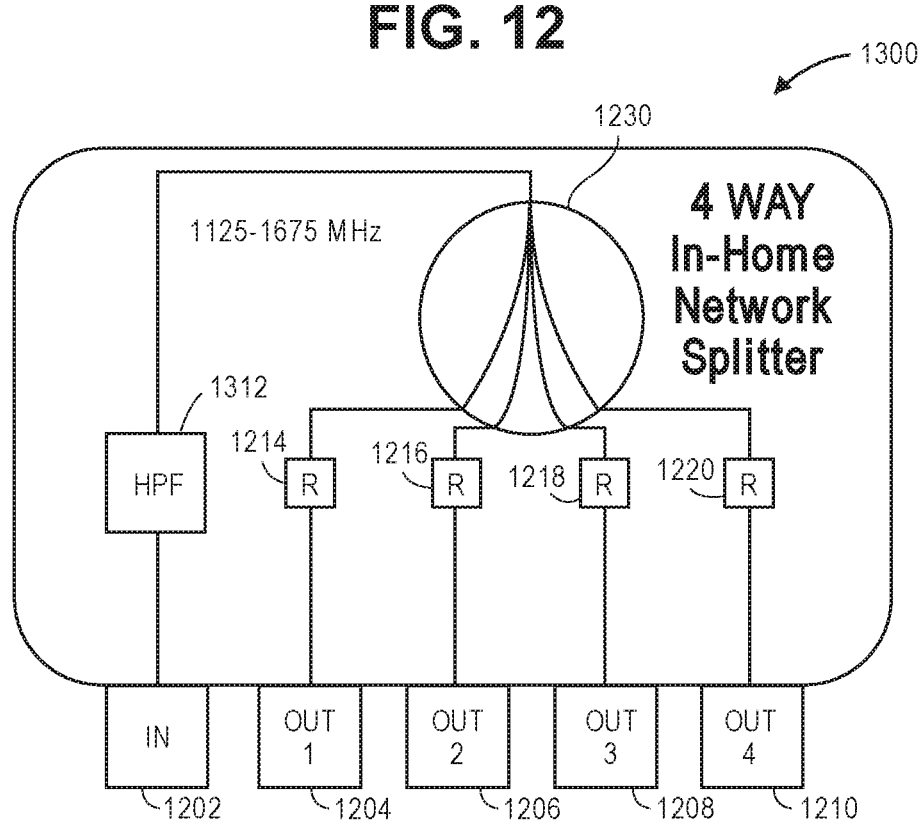
FIG. 13 illustrates a schematic view of an example of a resistive in-home network splitter, in accordance with aspects of the present disclosure.

FIG. 13 illustrates a schematic view of an example of another resistive in-home network splitter 1300, in accordance with aspects of the present disclosure. The splitter 1300 may be similar to the splitter 1200. For example, the splitter 1300 may include the ports 1202, 1204, 1206, 1208, 1210, the resistors 1214, 1216, 1218, 1220, and the common node 1230. In addition, the splitter 1300 may also include a HPF 1312 between the input port 1202 and the common node 1230. The HPF 1312 may block DC, filter out low-frequency noise, surge and ESD.

Figure 14:
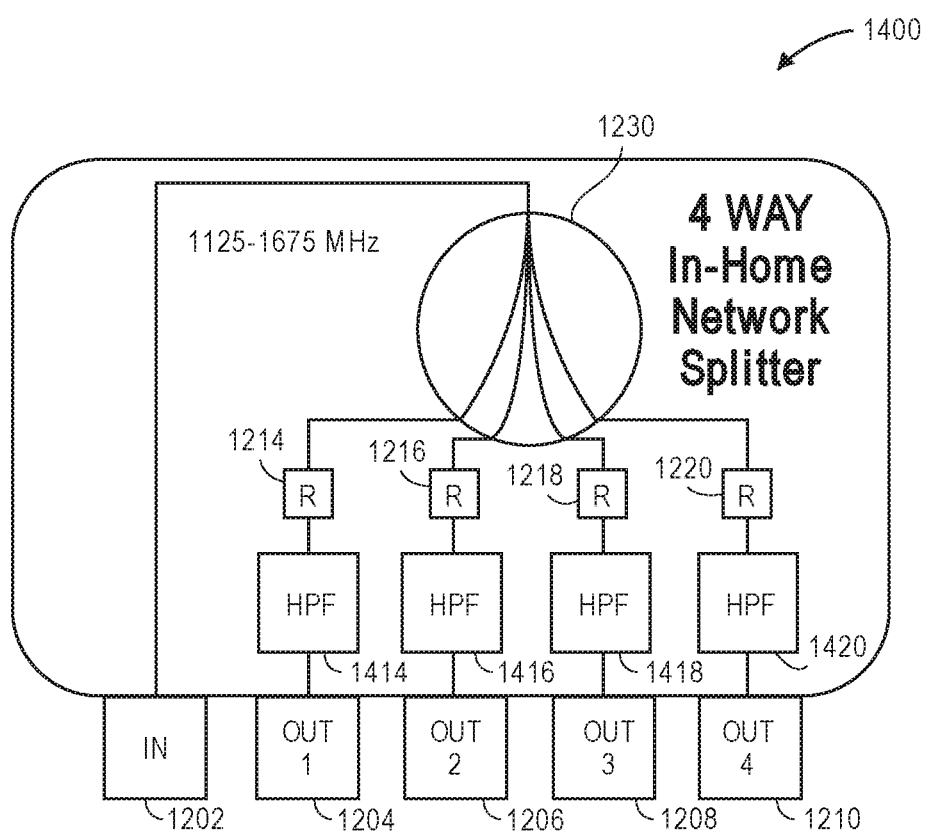
FIG. 14 illustrates a schematic view of an example of a resistive in-home network splitter, in accordance with aspects of the present disclosure.

FIG. 14 illustrates a schematic view of an example of yet another resistive in-home network splitter 1400, in accordance with aspects of the present disclosure. The splitter 1400 may be similar to the splitter 200. For example, the splitter 1400 may include the ports 1202, 1204, 1206, 1208, 1210, the resistors 1214, 1216, 1218, 1220, and the common node 1230. In addition, the splitter 1400 may also include a HPF 1414, 1416, 1418, 1420 between the common node 1230 and each of the output ports 1204, 1206, 1208, 1210. The HPFs 1414, 1416, 1418, 1420 may block DC, filter out low frequency noise, surge and ESD.

When the network is extended by adding more output ports, the cumulative ingress noise may increase. Adding the HPFs 1312, 1414, 1416, 1418, 1420 as in FIGS. 13 and 14 may reduce this ingress noise (e.g., exiting from the splitter 1300, 1400) into a another device (e.g., an access capable or CATV interface device such as a splitter or amplifier) with which the splitter 1300, 1400 is coupled or cascaded. Additionally, splitters 1200, 1300 and 1400 may all benefit from the inclusion of an internal or external RNA which would ensure matched coupling to access/CATV devices and ensure all DC, noise, surge and ESD are blocked or suppressed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A system for extending an in-home splitter network, comprising:
   a cable television (CATV) device that is configured to transmit and receive signals in a first bandwidth and signals in a second bandwidth, wherein the first bandwidth is higher than the second bandwidth;
   an in-home network splitter comprising:
      an input configured to be connected to the CATV device;
      a common node;
      a plurality of outputs;
      a reflection-less in-home network adapter (RNA) configured to be connected to and positioned between the input and the common node, wherein the RNA comprises a diplexer comprising a high-pass filter and a low-pass filter, wherein the high-pass filter and the low-pass filter have a common input and a common output such that the high-pass filter and the low pass filter are connected in parallel, wherein the low-pass filter comprises two low-pass filter portions and an attenuator circuit that are connected in series with the attenuator circuit positioned between the two low-pass filter portions, wherein the high-pass filter is configured to pass the signals in the first bandwidth to the common node and the plurality of outputs, wherein the low-pass filter is configured to terminate or attenuate the signals in the second bandwidth, and wherein an impedance of the RNA is configured to substantially match an impedance of the CATV device in the second bandwidth to prevent reflections in the second bandwidth;
      a first resistor connected to and positioned between the RNA and the common node; and
      a plurality of second resistors, wherein one of the plurality of second resistors is connected to and positioned between the common node and each of the plurality of outputs, and wherein the first resistor has a lesser resistance than each of the second resistors to minimize a through-loss of the in-home network splitter, and wherein each of the plurality of second resistors has a substantially equal resistive value; and
   a multimedia over coax alliance (MoCA) customer premise equipment (CPE) device configured to be connected to one of the plurality of outputs, wherein the MoCA CPE device is configured to be disposed within a user's premises, wherein the MoCA CPE device is configured to transmit and receive the signals in the first bandwidth, and wherein the MoCA CPE device is not configured to transmit and receive the signals in the second bandwidth.

2. The system of claim 1, wherein the CATV device comprises an amplifier configured to pass all upstream and downstream signals to a CATV headend and pass signals in the first bandwidth between a plurality of amplifier outputs.

3. The system of claim 1, wherein the CATV device comprises a passive splitter configured to pass upstream and downstream signals to a passive splitter input and a plurality of passive splitter outputs and pass signals in the first bandwidth between the plurality of passive splitter outputs, wherein at least a portion of the signals in the first bandwidth are configured to be reflected at a point of entry MoCA diplexer in the passive splitter.

4. The system of claim 1, wherein the CATV device comprises a passive splitter configured to pass upstream and downstream signals to a passive splitter input and a plurality of passive splitter outputs and pass signals in the first bandwidth between the plurality of passive splitter outputs, wherein at least a portion of the signals in the first bandwidth are configured to be reflected at a point of entry low-pass filter in the passive splitter.

5. The system of claim 1, wherein the CATV device comprises a passive splitter comprising:
   a passive splitter input;
   one or more first passive splitter outputs configured to transmit signals in the first bandwidth but not in the second bandwidth; and
   one or more second passive splitter outputs configured to transmit signals in the first bandwidth and in the second bandwidth.

6. A system for extending an in-home splitter network, comprising:
 a cable television (CATV) device that is configured to transmit and receive signals in a multimedia over coax alliance (MoCA) bandwidth and signals in a CATV bandwidth;
 a MoCA device that is configured to be disposed within a user's premises, wherein the MoCA device is configured to transmit and receive the signals in the MoCA bandwidth;
 an in-home network adapter configured to be connected to and positioned between the CATV device and the MoCA device, wherein the in-home network adapter comprises:
  a diplexer comprising a high-pass filter and a low-pass filter, wherein the high-pass filter and the low-pass filter have a common input and a common output such that the high-pass filter and the low pass filter are connected in parallel, wherein the low-pass filter comprises two low-pass filter portions and an attenuator circuit that are connected in series with the attenuator circuit positioned between the two low-pass filter portions;
  an in-home network splitter comprising an input and a plurality of outputs;
  a first resistor connected to and positioned between the diplexer and the input of the in-home network splitter;
  a plurality of second resistors, wherein one of the plurality of second resistors is connected to each of the plurality of outputs of the in-home network splitter, and wherein the first resistor has a lesser resistance than each of the second resistors to minimize a through-loss of the in-home network adapter, and wherein each of the plurality of second resistors has a substantially equal resistive value; and
  wherein an impedance of the in-home network adapter is configured to substantially match an impedance of the CATV device in the CATV bandwidth to prevent reflections in the CATV bandwidth.

7. The system of claim 6, wherein the MoCA device is not configured to transmit and receive the signals in the CATV bandwidth.

8. The system of claim 6, wherein the in-home network adapter allows the signals in the MoCA bandwidth to pass from the CATV device to the MoCA device and from the MoCA device to the CATV device.

9. The system of claim 6, wherein the in-home network adapter prevents the signals in the CATV bandwidth from passing from the CATV device to the MoCA device.

10. The system of claim 6, wherein the in-home network adapter absorbs, attenuates, or terminates the signals in the CATV bandwidth to prevent the signals in the CATV bandwidth from creating interference reflections back into the CATV device.

11. The system of claim 6, wherein the high-pass filter is configured to pass the signals in the MoCA bandwidth to the MoCA device, and wherein the low-pass filter is configured to terminate the signals in the CATV bandwidth.

12. The system of claim 6, wherein the high-pass filter is configured to pass the signals in the MoCA bandwidth to the MoCA device, and wherein the low-pass filter is configured to attenuate the signals in the CATV bandwidth with an attenuation circuit.

13. The system of claim 6, wherein the high-pass filter is configured to pass the signals in the MoCA bandwidth to the in-home network splitter, and wherein the low-pass filter is configured to terminate the signals in the CATV bandwidth.

14. A system for extending an in-home splitter network, comprising:
 a cable television (CATV) device that is configured to transmit and receive signals in a first bandwidth and signals in a second bandwidth, wherein the first bandwidth is from 1125 MHz to 1675 MHz, and wherein the second bandwidth is from 5 MHz to 1002 MHz;
 a multimedia over coax alliance (MoCA) device that is configured to be disposed within a user's premises, wherein the MoCA device is configured to transmit and receive the signals in the first bandwidth, and wherein the MoCA device is not configured to transmit and receive the signals in the second bandwidth; and
 an in-home network adapter that is configured to be connected to and positioned between the CATV device and the MoCA device, wherein the in-home network adapter comprises:
  a diplexer comprising a high-pass filter and a low-pass filter, wherein the high-pass filter and the low-pass filter have a common input and a common output such that the high-pass filter and the low pass filter are connected in parallel, wherein the low-pass filter comprises two low-pass filter portions and an attenuator circuit that are connected in series with the attenuator circuit positioned between the two low-pass filter portions;
  an in-home network splitter comprising an input and a plurality of outputs;
  a first resistor connected to and positioned between the diplexer and the input of the in-home network splitter;
  a plurality of second resistors, wherein one of the plurality of second resistors is connected to each of the plurality of outputs of the in-home network splitter, and wherein the first resistor has a lesser resistance than each of the second resistors to minimize a through-loss of the in-home network adapter, and wherein each of the plurality of second resistors has a substantially equal resistive value; and
  wherein the in-home network adapter allows the signals in the first bandwidth to pass from the CATV device to the MoCA device and from the MoCA device to the CATV device, wherein the in-home network adapter prevents the signals in the second bandwidth from passing from the CATV device to the MoCA device, and wherein an impedance of the in-home network adapter is configured to substantially match an impedance of the CATV device in the second bandwidth to prevent reflections in the second bandwidth.

15. The system of claim 14, wherein the first bandwidth comprises a MoCA bandwidth, and wherein the second bandwidth comprises a CATV bandwidth.

16. The system of claim 1, wherein the RNA comprises a matched terminator that is configured to be connected to the low-pass filter, and wherein the impedance of the RNA comprises an impedance of the matched terminator, which is configured to substantially match the impedance of the CATV device to prevent the reflections in the second bandwidth.

17. The system of claim 1, wherein the impedance of the RNA substantially matching the impedance of the CATV device is configured to cause a return loss proximate to the input to be greater than 18 dB in the second bandwidth to prevent the reflections in the second bandwidth.

18. A system, comprising:
a first device comprising:
an input configured to be connected to an upstream device, wherein the input is configured to receive signals in a first bandwidth and signals in a second bandwidth, wherein the first bandwidth is higher than the second bandwidth;
a plurality of outputs, wherein each output is configured to be connected to a customer premise equipment (CPE) device;
an in-home network adapter configured to be connected to and positioned between the input and the plurality of outputs, wherein the in-home network adapter comprises a diplexer comprising a high-pass filter and a low-pass filter, wherein the high-pass filter and the low-pass filter have a common input and a common output such that the high-pass filter and the low pass filter are connected in parallel, wherein the low-pass filter comprises two low-pass filter portions and an attenuator circuit that are connected in series with the attenuator circuit positioned between the two low-pass filter portions, wherein the in-home network adapter is configured to allow the signals in the first bandwidth to pass from the input to the plurality of outputs and from the plurality of outputs to the input, wherein the in-home network adapter is configured to attenuate or prevent the signals in the second bandwidth from passing from the input to the plurality of outputs, from the plurality of outputs to the input, or both, and wherein an impedance of the in-home network adapter is configured to substantially match an impedance of the upstream device in the second bandwidth to prevent reflections in the second bandwidth;
a splitter connected to and positioned between the in-home network adapter and the plurality of outputs;
a first resistor connected to and positioned between the in-home network adapter and the splitter; and
a plurality of second resistors, wherein one of the plurality of second resistors is connected to and positioned between the splitter and each of the plurality of outputs, and wherein the first resistor has a lesser resistance than each of the second resistors to minimize a through-loss of the first device, and wherein each of the plurality of second resistors has a substantially equal resistive value.

19. The system of claim 18, wherein the in-home network adapter is configured to cause a return loss at the input to be greater than 5 dB in the first bandwidth and greater than 18 dB in the second bandwidth.

20. The system of claim 19, wherein the impedance of the in-home network adapter is proximate to the input and is configured to substantially match the impedance at an output of the upstream device in the first bandwidth to cause the return loss to be greater than 5 dB in the first bandwidth.

21. The system of claim 19, wherein the impedance of the in-home network adapter is proximate to the input and is configured to substantially match the impedance at an output of the upstream device to cause the return loss to be greater than 18 dB in the second bandwidth.

22. The system of claim 19, wherein the upstream device comprises a second device, and wherein the impedance of the in-home network adapter is proximate to the input and is configured to substantially match the impedance at an output of the second device in the first and second bandwidths to cause the return loss to be greater than 5 dB in the first bandwidth and greater than 18 dB in the second bandwidth.

23. A system, comprising:
a first device comprising:
an input;
a first diplexer connected to the input of the first device;
a second diplexer connected to the input of the first device;
a first output connected to the first diplexer; and
a plurality of second outputs connected to the second diplexer; and
a second device comprising:
an input configured to be connected to one of the second outputs, wherein the input of the second device is configured to receive signals in a first bandwidth and signals in a second bandwidth, wherein the first bandwidth comprises a multimedia over coax alliance (MoCA) bandwidth, wherein the second bandwidth comprises a cable television (CATV) bandwidth, and wherein the first bandwidth and the second bandwidth do not overlap;
a plurality of outputs, wherein each output of the second device is configured to be connected to a customer premise equipment (CPE) device; and
an in-home network adapter configured to be connected to and positioned between the input of the second device and the plurality of outputs of the second device, wherein the in-home network adapter comprises a third diplexer comprising a high-pass filter and a low-pass filter, wherein the high-pass filter and the low-pass filter have a common input and a common output such that the high-pass filter and the low pass filter are connected in parallel, wherein the low-pass filter comprises two low-pass filter portions and an attenuator circuit that are connected in series with the attenuator circuit positioned between the two low-pass filter portions, wherein the in-home network adapter is configured to allow the signals in the first bandwidth to pass from the input of the second device to the plurality of outputs of the second device and from the plurality of outputs of the second device to the input of the second device, wherein the in-home network adapter is configured to attenuate or prevent the signals in the second bandwidth from passing from the input of the second device to the plurality of outputs of the second device, from the plurality of outputs of the second device to the input of the second device, or both, wherein an impedance of the in-home network adapter is configured to substantially match an impedance of the first device in the second bandwidth, thereby causing a return loss at the input of the second device to be greater than 5 dB in the first bandwidth and greater than 18 dB in the second bandwidth to prevent reflections in the second bandwidth;
a splitter connected to and positioned between the in-home network adapter and the plurality of outputs;
a first resistor connected to and positioned between the in-home network adapter and the splitter;
a plurality of second resistors, wherein one of the plurality of second resistors is connected to and positioned between the splitter and each of the plurality of outputs, and wherein the first resistor has a lesser resistance than each of the second resistors to minimize a through-loss of the second device, and wherein each of the plurality of second resistors has a substantially equal resistive value.

24. The system of claim 23, wherein the input of the first device is configured to receive the signals in the second bandwidth and to pass the signals in the second bandwidth to the first diplexer and the second diplexer.

25. The system of claim 24, wherein the first diplexer is configured to pass the signals in the first bandwidth between the second diplexer and the first output and to pass the signals in the second bandwidth between the input of the first device and the first output.

26. The system of claim 23, wherein the attenuator circuit comprises:
   a terminator that is configured to terminate the signals in the second bandwidth, and wherein the impedance of the terminator is configured to substantially match the impedance of the first device in the second bandwidth to prevent the reflections in the second bandwidth.

27. The system of claim 23, further comprising a second high pass filter connected to and positioned between the in-home network adapter and one of the plurality of outputs of the second device.

28. The system of claim 27, wherein the second high pass filter is configured to attenuate or prevent the signals in the second bandwidth from passing from the input of the second device to the one of the plurality of outputs of the second device.

29. The system of claim 27, wherein the second high pass filter is configured to attenuate or prevent low frequency noise, surge, and electrostatic discharge between the input of the second device to the one of the plurality of outputs of the second device.

30. The system of claim 27, wherein the second high pass filter comprises one or more series direct current (DC) blocking capacitors, one or more shunt coils, or a combination thereof.

31. A system, comprising:
   a first device comprising:
      a first input;
      a first splitter connected to the first input;
      a first diplexer comprising a first common port, a first high-pass filter, and a first low-pass filter, wherein a first output of the first splitter is connected to the first common port;
      a second diplexer comprising a second common port, a second high-pass filter, and a second low-pass filter, wherein the first high-pass filter is connected to the second high-pass filter, and wherein the first low-pass filter is connected to the second low-pass filter;
      a first diode connected to and positioned between the first and second high-pass filters, wherein the first diode allows signals to pass from the first high-pass filter to the second high-pass filter and prevents signals from passing from the second high-pass filter to the first high-pass filter;
      a second diode connected to and positioned between the first and second low-pass filters, wherein the second diode allows signals to pass from the second low-pass filter to the first low-pass filter and prevents signals from passing from the first low-pass filter to the second low-pass filter;
      a third diplexer comprising a third common port, a third high-pass filter, and a third low-pass filter, wherein the second common port is connected to the third low-pass filter;
      a fourth diplexer comprising a fourth common port, a fourth high-pass filter, and a fourth low-pass filter, wherein a second output of the first splitter is connected to the fourth low-pass filter, wherein the third high-pass filter is connected to the fourth high-pass filter, and wherein the fourth common port is connected to a first output;
      a second splitter connected to the third common port; and
      a plurality of second outputs connected to the second splitter; and
   a second device comprising:
      a second input configured to be connected to one of the second outputs of the first device, wherein the second input is configured to receive signals in a cable television (CATV) bandwidth and signals in a multimedia over coax alliance (MoCA) bandwidth from the first device, wherein the CATV bandwidth and the MoCA bandwidth do not overlap;
      a plurality of third outputs, wherein each third output is configured to be connected to a customer premise equipment (CPE) device; and
      an in-home network adapter configured to be connected to and positioned between the second input and the plurality of third outputs, wherein the in-home network adapter comprises a fifth diplexer comprising a fifth high-pass filter and a fifth low-pass filter, wherein the fifth high-pass filter and the fifth low-pass filter have a common input and a common output such that the fifth high-pass filter and the fifth low pass filter are connected in parallel, wherein the fifth low-pass filter comprises two low-pass filter portions and an attenuator circuit that are connected in series with the attenuator circuit positioned between the two low-pass filter portions, wherein the in-home network adapter is configured to allow the signals in the MoCA bandwidth to pass from the second input to the plurality of third outputs and from the plurality of third outputs to the second input, wherein the in-home network adapter is configured to attenuate or prevent the signals in the CATV bandwidth from passing from the second input to the plurality of third outputs, from the plurality of third outputs to the second input, or both, wherein an impedance of the in-home network adapter is configured to substantially match an impedance of the first device in the CATV bandwidth, thereby causing a return loss at the second input to be greater than 5 dB in the MoCA bandwidth and greater than 18 dB in the CATV bandwidth to prevent reflections in the CATV bandwidth;
      a third splitter connected to and positioned between the in-home network adapter and the plurality of third outputs;
      a first resistor connected to and positioned between the in-home network adapter and the third splitter;
      a plurality of second resistors, wherein one of the plurality of second resistors is connected to and positioned between the third splitter and each of the plurality of third outputs, and wherein the first resistor has a lesser resistance than each of the second resistors to minimize a through-loss of the second device, and wherein each of the plurality of second resistors has a substantially equal resistive value.

32. The system of claim 31, wherein the second device does not comprise a bridge circuit.

33. The system of claim 31, wherein the in-home network adapter does not comprise a bridge circuit.

34. A system, comprising:
a first device comprising:
- a first input;
- a first splitter configured to connect to the first input;
- a first diplexer comprising a first common port, a first high-pass filter, and a first low-pass filter;
- a second diplexer comprising a second common port, a second high-pass filter, and a second low-pass filter;
- a first diode configured to be connected to and positioned between the first and second high-pass filters;
- a second diode configured to be connected to and positioned between the first and second low-pass filters;
- a third diplexer comprising a third common port, a third high-pass filter, and a third low-pass filter;
- a fourth diplexer comprising a fourth common port, a fourth high-pass filter, and a fourth low-pass filter;
- a second splitter configured to connect to the third common port;
- a plurality of first outputs configured to connect to the second splitter; and
- a second output configured to connect to the fourth common port; and a second device comprising:
- a second input configured to connect to one of the first outputs;
- a plurality of third outputs;
- an in-home network adapter configured to be connected to and positioned between the second input and the plurality of third outputs;
- a third splitter configured to be connected to and positioned between the in-home network adapter and the plurality of third outputs;
- a first resistor configured to be connected to and positioned between the in-home network adapter and the third splitter;
- a plurality of second resistors;
- a plurality of sixth high-pass filters;
- wherein a first output of the first splitter is configured to connect to the first common port;
- wherein the first high-pass filter is configured to connect to the second high-pass filter;
- wherein the first low-pass filter is configured to connect to the second low-pass filter;
- wherein the first diode allows signals to pass from the first high-pass filter to the second high-pass filter and prevents signals from passing from the second high-pass filter to the first high-pass filter;
- wherein the second diode allows signals to pass from the second low-pass filter to the first low-pass filter and prevents signals from passing from the first low-pass filter to the second low-pass filter;
- wherein the second common port is configured to connect to the third low-pass filter;
- wherein a second output of the first splitter is configured to connect to the fourth low-pass filter;
- wherein the third high-pass filter is configured to connect to the fourth high-pass filter;
- wherein the second input is configured to receive signals in a cable television (CATV) bandwidth and signals in a multimedia over coax alliance (MoCA) bandwidth from the first device;
- wherein the CATV bandwidth and the MoCA bandwidth do not overlap;
- wherein each third output is configured to connect to a customer premise equipment (CPE) device;
- wherein the in-home network adapter comprises a fifth diplexer comprising a fifth high-pass filter and a fifth low-pass filter;
- wherein the fifth high-pass filter and the fifth low-pass filter have a common input and a common output such that the fifth high-pass filter and the fifth low-pass filter are connected in parallel;
- wherein the fifth low-pass filter comprises two low-pass filter portions and an attenuator circuit that are connected in series with the attenuator circuit positioned between the two low-pass filter portions;
- wherein the in-home network adapter is configured to allow the signals in the MoCA bandwidth to pass from the second input to the plurality of third outputs and from the plurality of third outputs to the second input;
- wherein the in-home network adapter is configured to attenuate or prevent the signals in the CATV bandwidth from passing from the second input to the plurality of third outputs, from the plurality of third outputs to the second input, or both;
- wherein an impedance of the in-home network adapter is configured to substantially match an impedance of the first device in the CATV bandwidth, thereby causing a return loss at the second input to be greater than 5 dB in the MoCA bandwidth and greater than 18 dB in the CATV bandwidth to prevent reflections in the CATV bandwidth;
- wherein one of the plurality of second resistors is configured to be connected to and positioned between the third splitter and each of the plurality of third outputs;
- wherein the first resistor has a lesser resistance than each of the second resistors to minimize a through-loss of the second device;
- wherein each of the plurality of second resistors has a substantially equal resistive value; and
- wherein each of the sixth high-pass filters is configured to be connected between one of the second resistors and one of the third outputs.

35. The system of claim 34, wherein the sixth high-pass filters are configured to reduce low-frequency noise, surge, electrostatic discharge, or a combination thereof.

36. The system of claim 34, wherein the second device does not comprise a bridge circuit.

37. The system of claim 34, wherein the in-home network adapter does not comprise a bridge circuit.

38. A system, comprising:
a first device comprising:
- a first input;
- a first splitter configured to connect to the first input;
- a first diplexer comprising a first common port, a first high-pass filter, and a first low-pass filter;
- a second diplexer comprising a second common port, a second high-pass filter, and a second low-pass filter;
- a first diode configured to be connected to and positioned between the first and second high-pass filters;
- a second diode configured to be connected to and positioned between the first and second low-pass filters;
- a third diplexer comprising a third common port, a third high-pass filter, and a third low-pass filter;
- a fourth diplexer comprising a fourth common port, a fourth high-pass filter, and a fourth low-pass filter;
- a second splitter configured to connect to the third common port;

a plurality of first outputs configured to connect to the second splitter; and
a second output configured to connect to the fourth common port; and
a second device comprising:
a second input configured to connect to one of the first outputs;
a plurality of third outputs;
an in-home network adapter comprising a fifth diplexer that is configured to be connected to and positioned between the second input and the plurality of third outputs;
a third splitter configured to be connected to and positioned between the in-home network adapter and the plurality of third outputs;
a first resistor configured to be connected to and positioned between the in-home network adapter and the third splitter;
a plurality of second resistors;
a plurality of sixth high-pass filters;
wherein the second input is configured to receive signals in a cable television (CATV) bandwidth and signals in a multimedia over coax alliance (MoCA) bandwidth from the first device;
wherein the CATV bandwidth and the MoCA bandwidth do not overlap;
wherein each third output is configured to connect to a customer premise equipment (CPE) device;
wherein the in-home network adapter is configured to allow the signals in the MoCA bandwidth to pass from the second input to the plurality of third outputs and from the plurality of third outputs to the second input;
wherein the in-home network adapter is configured to attenuate or prevent the signals in the CATV bandwidth from passing from the second input to the plurality of third outputs, from the plurality of third outputs to the second input, or both;
wherein one of the plurality of second resistors is configured to be connected to and positioned between the third splitter and each of the plurality of third outputs;
wherein the first resistor has a lesser resistance than each of the second resistors to minimize a through-loss of the second device; and
wherein each of the sixth high-pass filters is configured to be connected between one of the second resistors and one of the third outputs to reduce low-frequency noise, surge, electrostatic discharge, or a combination thereof.

39. The system of claim 38, wherein a first output of the first splitter is configured to connect to the first common port;
wherein the first high-pass filter is configured to connect to the second high-pass filter;
wherein the first low-pass filter is configured to connect to the second low-pass filter;
wherein the first diode allows signals to pass from the first high-pass filter to the second high-pass filter and prevents signals from passing from the second high-pass filter to the first high-pass filter; and
wherein the second diode allows signals to pass from the second low-pass filter to the first low-pass filter and prevents signals from passing from the first low-pass filter to the second low-pass filter.

40. The system of claim 38, wherein the second common port is configured to connect to the third low-pass filter;
wherein a second output of the first splitter is configured to connect to the fourth low-pass filter; and
wherein the third high-pass filter is configured to connect to the fourth high-pass filter.

41. The system of claim 38, wherein the fifth diplexer comprises a fifth high-pass filter and a fifth low-pass filter;
wherein the fifth high-pass filter and the fifth low-pass filter have a common input and a common output such that the fifth high-pass filter and the fifth low-pass filter are connected in parallel; and
wherein the fifth low-pass filter comprises two low-pass filter portions and an attenuator circuit that are connected in series with the attenuator circuit positioned between the two low-pass filter portions.

42. The system of claim 38, wherein an impedance of the in-home network adapter is configured to substantially match an impedance of the first device in the CATV bandwidth, thereby causing a return loss at the second input to be greater than 5 dB in the MoCA bandwidth and greater than 18 dB in the CATV bandwidth to prevent reflections in the CATV bandwidth.

43. The system of claim 38, wherein each of the plurality of second resistors has a substantially equal resistive value.

44. A system, comprising:
a first device comprising:
a first input; and
a plurality of first outputs; and
a second device comprising:
a second input configured to connect to one of the first outputs;
a plurality of second outputs;
an in-home network adapter comprising a diplexer that is configured to be connected to and positioned between the second input and the plurality of second outputs;
a splitter configured to be connected to and positioned between the in-home network adapter and the plurality of second outputs;
a first resistor configured to be connected to and positioned between the in-home network adapter and the splitter;
a plurality of second resistors;
a plurality of high-pass filters;
wherein the in-home network adapter is configured to allow the signals in the MoCA bandwidth to pass from the second input to the plurality of third outputs and from the plurality of third outputs to the second input;
wherein the in-home network adapter is configured to attenuate or prevent the signals in the CATV bandwidth from passing from the second input to the plurality of third outputs, from the plurality of third outputs to the second input, or both;
wherein one of the plurality of second resistors is configured to be connected to and positioned between the splitter and each of the plurality of second outputs;
wherein the first resistor has a lesser resistance than each of the second resistors to minimize a through-loss of the second device; and
wherein each of the high-pass filters is configured to be connected between one of the second resistors and one of the second outputs.

45. The system of claim 44, wherein the second device does not comprise a bridge circuit.

46. The system of claim 44, wherein the in-home network adapter does not comprise a bridge circuit.

47. The system of claim 44, wherein the diplexer comprises a high-pass filter and a low-pass filter; and
 wherein the high-pass filter and the low-pass filter of the diplexer have a common input and a common output such that the high-pass filter and the low-pass filter of the diplexer are connected in parallel.

48. The system of claim 47,
 wherein the low-pass filter comprises two low-pass filter portions and an attenuator circuit that are connected in series with the attenuator circuit positioned between the two low-pass filter portions.

49. The system of claim 44, wherein each of the plurality of second resistors has a substantially equal resistive value.

50. The system of claim 44, wherein the second input is configured to receive signals in a cable television (CATV) bandwidth and signals in a multimedia over coax alliance (MoCA) bandwidth from the first device;
 wherein the CATV bandwidth and the MoCA bandwidth do not overlap; and
 wherein each third output is configured to connect to a customer premise equipment (CPE) device.

* * * * *